US012633543B2

(12) United States Patent
Son et al.

(10) Patent No.: US 12,633,543 B2
(45) **Date of Patent: *May 19, 2026**

(54) SILICON COMPOSITE CLUSTER AND CARBON COMPOSITE THEREOF, AND ELECTRODE, LITHIUM BATTERY, AND ELECTRONIC DEVICE EACH INCLUDING THE SAME

(71) Applicants: Samsung Electronics Co., Ltd., Suwon-si (KR); Samsung SDI Co., Ltd., Gyeonggi-do (KR)

(72) Inventors: Inhyuk Son, Yongin-si (KR); Mijong Kim, Suwon-si (KR); Jumyeung Lee, Suwon-si (KR); Minwoo Lim, Hwaseong-si (KR); Junghyun Choi, Yongin-si (KR); Sungsoo Han, Hwaseong-si (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,078

(22) Filed: Oct. 3, 2023

(65) Prior Publication Data

US 2024/0030452 A1 Jan. 25, 2024

Related U.S. Application Data

(63) Continuation of application No. 16/230,946, filed on Dec. 21, 2018, now Pat. No. 11,824,198.

(30) Foreign Application Priority Data

Jan. 3, 2018 (KR) ........................ 10-2018-0000905
Dec. 11, 2018 (KR) ........................ 10-2018-0159039

(51) Int. Cl.
*H01M 4/62* (2006.01)
*H01M 4/02* (2006.01)
(Continued)

(52) U.S. Cl.
CPC ............. *H01M 4/625* (2013.01); *H01M 4/02* (2013.01); *H01M 4/0471* (2013.01);
(Continued)

(58) Field of Classification Search
CPC ........ H01M 4/134; H01M 4/386; H01M 4/02; H01M 4/0471; H01M 4/1393;
(Continued)

(56) References Cited

U.S. PATENT DOCUMENTS 7,655,354 B2 2/2010 Kawase et al.
7,816,031 B2 10/2010 Cui et al.
(Continued)

FOREIGN PATENT DOCUMENTS

CN 101047269 A 10/2007
CN 102110853 A 6/2011
(Continued)

OTHER PUBLICATIONS

Junli Li et al., "Facile Synthesis of Silicon Nanoparticles Embedded in 3D N-doped Graphene as Anode Materials for High-Performance Lithium Ion Batteries", International Journal of Electrochemical Science, Apr. 12, 2017, pp. 4164-4172, vol. 12.
(Continued)

*Primary Examiner* — Miriam Stagg
*Assistant Examiner* — Lilia Nedialkova
(74) *Attorney, Agent, or Firm* — CANTOR COLBURN LLP

(57) ABSTRACT

A porous silicon composite includes: a porous core including a porous silicon composite secondary particle; and a shell disposed on a surface of the porous core and surround-
(Continued)

ing the porous core, wherein the porous silicon composite secondary particle includes an aggregate of silicon composite primary particles, each including silicon, a silicon suboxide on a surface of the silicon, and a first graphene on a surface of the silicon suboxide, wherein the shell include a second graphene, and at least one of the first graphene and the second graphene includes at least one element selected from nitrogen, phosphorus, and sulfur.

46 Claims, 13 Drawing Sheets

(51) Int. Cl.

| | |
|---|---|
| ***H01M 4/04*** | (2006.01) |
| ***H01M 4/134*** | (2010.01) |
| ***H01M 4/1393*** | (2010.01) |
| ***H01M 4/1395*** | (2010.01) |
| ***H01M 4/36*** | (2006.01) |
| ***H01M 4/38*** | (2006.01) |
| ***H01M 4/583*** | (2010.01) |
| ***H01M 10/0525*** | (2010.01) |
| ***H01M 10/0565*** | (2010.01) |

(52) U.S. Cl.
CPC ......... *H01M 4/134* (2013.01); *H01M 4/1393* (2013.01); *H01M 4/1395* (2013.01); *H01M 4/362* (2013.01); *H01M 4/364* (2013.01); *H01M 4/366* (2013.01); *H01M 4/38* (2013.01); *H01M 4/386* (2013.01); *H01M 4/583* (2013.01); *H01M 10/0525* (2013.01); *H01M 10/0565* (2013.01); *H01M 2004/027* (2013.01)

(58) Field of Classification Search
CPC ...... H01M 4/1395; H01M 4/36; H01M 4/362; H01M 4/364; H01M 4/366; H01M 4/38; H01M 4/48; H01M 4/583; H01M 4/625; H01M 10/0525; H01M 10/0565; H01M 2004/027; Y02E 60/10
See application file for complete search history.

(56) References Cited

U.S. PATENT DOCUMENTS

| | | | |
|---|---|---|---|
| 8,241,793 | B2 | 8/2012 | Zhamu et al. |
| 8,722,442 | B2 | 5/2014 | Kim et al. |
| 8,753,545 | B2 | 6/2014 | Obrovac et al. |
| 8,999,583 | B2 | 4/2015 | Hirose et al. |
| 9,536,735 | B2 | 1/2017 | Son et al. |
| 9,548,490 | B2 | 1/2017 | Ku et al. |
| 9,564,631 | B2 | 2/2017 | Kim et al. |
| 9,595,711 | B2 | 3/2017 | Son et al. |
| 9,601,766 | B2 | 3/2017 | Song et al. |
| 9,923,197 | B2 | 3/2018 | Lee et al. |
| 9,947,926 | B2 | 4/2018 | Kim et al. |
| 9,959,947 | B2 | 5/2018 | Son et al. |
| 9,972,833 | B2 | 5/2018 | Jung et al. |
| 10,181,600 | B2 | 1/2019 | Scoyer et al. |
| 10,263,249 | B2 | 4/2019 | Kim et al. |
| 10,749,171 | B2 | 8/2020 | Chen et al. |
| 10,818,915 | B2 | 10/2020 | Hwang et al. |
| 2010/0176337 | A1 | 7/2010 | Zhamu et al. |
| 2010/0273058 | A1 | 10/2010 | Lee et al. |
| 2010/0288077 | A1 | 11/2010 | Le |
| 2011/0159368 | A1 | 6/2011 | Hirose et al. |
| 2012/0121977 | A1 | 5/2012 | Xu et al. |
| 2012/0326128 | A1 | 12/2012 | Shin et al. |
| 2013/0130115 | A1 | 5/2013 | Park et al. |
| 2013/0136986 | A1 | 5/2013 | Scoyer et al. |
| 2014/0087268 | A1 | 3/2014 | Kim et al. |
| 2014/0255781 | A1 | 9/2014 | Son et al. |
| 2014/0255785 | A1 | 9/2014 | Do et al. |
| 2015/0093648 | A1 | 4/2015 | Son et al. |
| 2015/0380728 | A1 | 12/2015 | Son et al. |
| 2016/0036049 | A1 | 2/2016 | Wang et al. |
| 2016/0315311 | A1 | 10/2016 | Jeon et al. |
| 2016/0346769 | A1 | 12/2016 | Kim et al. |
| 2017/0047584 | A1 | 2/2017 | Hwang et al. |
| 2017/0062804 | A1 | 3/2017 | Son et al. |
| 2017/0141387 | A1 | 5/2017 | Hayner et al. |
| 2018/0083272 | A1 | 3/2018 | Son et al. |
| 2018/0248194 | A1 | 8/2018 | Cheng et al. |
| 2020/0036049 | A1 | 1/2020 | Lee et al. |
| 2020/0044241 | A1 | 2/2020 | Gigler et al. |

FOREIGN PATENT DOCUMENTS

| | | | |
|---|---|---|---|
| CN | 102958835 | A | 3/2013 |
| CN | 103702929 | A | 4/2014 |
| CN | 104518208 | A | 4/2015 |
| CN | 103787320 | B | 10/2015 |
| CN | 105006547 | A | 10/2015 |
| CN | 106415898 | A | 2/2017 |
| CN | 104399415 | B | 3/2017 |
| CN | 107210431 | A | 9/2017 |
| EP | 2854204 | A1 | 4/2015 |
| JP | 2014532024 | A | 12/2014 |
| KR | 20130006869 | A | 1/2013 |
| KR | 1271249 | B1 | 6/2013 |
| KR | 101476043 | B1 | 12/2014 |
| KR | 20150128592 | A | 11/2015 |
| KR | 20150141924 | A1 | 12/2015 |
| KR | 101724196 | B1 | 4/2017 |
| KR | 20170066848 | A | 6/2017 |
| WO | 2016123718 | A1 | 8/2016 |
| WO | 2017033213 | A1 | 3/2017 |
| WO | 2017083566 | A1 | 5/2017 |
| WO | 2017164963 | A2 | 9/2017 |

OTHER PUBLICATIONS

Ding Ding et al., "Plasma-assisted nitrogen doping of graphene encapsulated Pt nanocrystals as efficient fuel cell catalysts", Journal of Materials Chemistry A, Oct. 30, 2013, pp. 472-477, vol. 2.

Chinese Office Action for Chinese Patent Application No. 201910001030.7 dated Jan. 11, 2024.

Junli Li et al., "Facile Synthesis of Silicon Nanoparticles Embedded in 3D N-doped Graphene as Anode Materials for High-Performance Lithium Ion Batteries", Jan. 20, 2017, Int. J. Electrochem. Sci., 12, 2017, 4164-4172.

SILICON COMPOSITE CLUSTER AND CARBON COMPOSITE THEREOF, AND ELECTRODE, LITHIUM BATTERY, AND ELECTRONIC DEVICE EACH INCLUDING THE SAME

CROSS-REFERENCE TO RELATED APPLICATION

This application is a continuation of U.S. patent application Ser. No. 16/230,946, filed on Dec. 21, 2018, now U.S. Pat. No. 11,824,198, and claims the benefit of Korean Patent Application Nos. 10-2018-0000905, filed on Jan. 3, 2018, and 10-2018-159039 filed on Dec. 11, 2018, in the Korean Intellectual Property Office, the disclosure of which is incorporated herein in its entirety by reference.

BACKGROUND

1. Field

The present disclosure relates to a silicon-containing composite, a carbon composite including the silicon-containing composite, and an electrode, a lithium battery, and an electronic device, each including the porous silicon composite cluster.

2. Description of the Related Art

Silicon, has a theoretical capacity of 4,200 milliampere hours per gram (mAh/g) and a relatively low cost, and thus has been considered for use as a negative electrode material in a lithium ion battery. However, silicon may undergo a large volume expansion due to the generation of a $Li_{4.4}Si$ alloy during discharge of a battery, and thus produce an electrically isolated active material in the electrode. Furthermore, an increase in the specific surface area of the active material may accelerate an electrolyte decomposition reaction. Therefore, it would be beneficial to develop a structure capable of suppressing the volumetric expansion of silicon and subsequent pulverization of the silicon.

SUMMARY

Provided is a silicon-containing composite.

Provided is a carbon composite including the silicon-containing composite and a carbonaceous material.

Provided is an electrode including the silicon-containing composite or the carbon composite.

Provided is a lithium battery including an electrode that includes the silicon-containing composite or that includes a carbon composite including the silicon-containing composite and a carbonaceous material.

Provided is a field emission device including the silicon-containing composite or including a carbon composite including the silicon-containing composite and a carbonaceous material.

Provided is a biosensor including the silicon-containing composite or including a carbon composite including the silicon-containing composite and the carbonaceous material.

Provided is a semiconductor device including the silicon-containing composite or including a carbon composite including the silicon-containing composite and the carbonaceous material.

Provided is a thermoelectric device including the silicon-containing composite or including a carbon composite including the silicon-containing composite and the carbonaceous material.

Additional aspects will be set forth in part in the description which follows and, in part, will be apparent from the description, or may be learned by practice of the presented embodiments.

According to an aspect of an embodiment, a silicon-containing composite includes: a porous core including a porous silicon composite secondary particle, and a shell on a surface of the porous core and surrounding the porous core, wherein the porous silicon composite secondary particle includes an aggregate of silicon composite primary particles, each including
silicon,
a silicon suboxide on a surface of the silicon, and
a first graphene on a surface of the silicon suboxide,
wherein the shell includes a second graphene, and
wherein at least one of the first graphene and the second graphene includes at least one element selected from nitrogen (N), phosphorus (P), and sulfur (S).

According to an aspect of another embodiment, a method of preparing a porous silicon composite includes:

providing a porous silicon secondary particle;
supplying at least one of a nitrogen precursor, a phosphorus precursor, or a sulfur precursor, and a carbon source gas to the porous silicon secondary particle; and
thermally treating the porous silicon secondary particle to prepare the porous silicon-containing composite.

According to an aspect of another embodiment, a carbon composite includes the porous silicon composite and a carbonaceous material.

According to an aspect of another embodiment, an electrode includes the porous silicon composite, the carbon composite, or a combination thereof.

According to an aspect of another embodiment, a lithium battery includes the electrode, which includes the silicon-containing composite, the carbon composite, or a combination thereof.

According to an aspect of another embodiment, an electronic device includes the silicon-containing composite, the carbon composite, or the combination thereof.

The electronic device may be a field emission device, a biosensor, a semiconductor device, or a thermoelectric device.

According to an aspect of another embodiment, a silicon-containing composite includes:

a core including a porous silicon composite secondary particle; and
a shell on and surrounding the core,
wherein the porous silicon composite secondary particle includes an aggregate of silicon composite primary particles,
the silicon composite primary particles each include
a silicon suboxide,
a thermal treatment product of the silicon suboxide; and
a first graphene on a surface of the silicon suboxide, the thermal treatment product of the silicon suboxide, or the combination thereof.
wherein the shell comprises a second graphene, and at least one of the first graphene and the second graphene comprises at least one element selected from nitrogen (N), phosphorus (P), and sulfur (S).

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
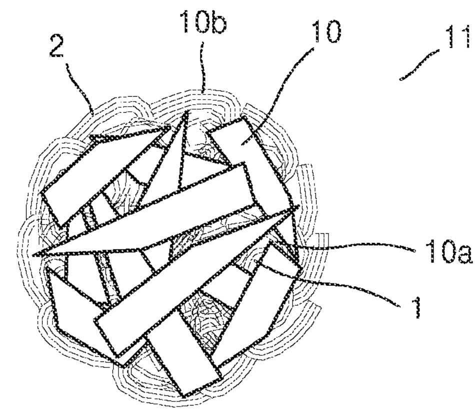
FIG. 1A is a schematic view illustrating a structure of a silicon-containing composite according to an embodiment.

Reference will now be made in detail to embodiments of at least one silicon-containing composite, an electrode including an electrode active material containing the silicon-containing composite, and a lithium battery, a field emission device, a biosensor, and a semiconductor device each including the silicon-containing composite, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

As used herein, the term "and/or" includes any and all combinations of one or more of the associated listed items. Expressions such as "at least one of," when preceding a list of elements, modify the entire list of elements and do not modify the individual elements of the list.

As used herein, the singular forms includes any and all combinations to include the plural forms, including s, including s, including s of one or more of the associated list to include the plural forms, includes any and all combinations used herein. As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The formation of a coating layer of, for example, carbon on surfaces of the silicon, has been suggested as a way to address the volumetric expansion of silicon and the subsequent pulverization which occur during discharging of a battery. However, currently available silicon materials are still not satisfactory in terms of their ability to effectively minimize volumetric expansion and improve charging and discharging efficiency of batteries According to an aspect, a silicon-containing composite includes: a porous core including a porous silicon composite secondary particle, and a shell on a surface of the porous core and surrounding the porous core, the shell including a second graphene,

- wherein the porous silicon composite secondary particle includes an aggregate of silicon composite primary particles, each including
  - silicon,
  - a silicon suboxide on at least one surface of the silicon, and
  - a first graphene on a surface of the silicon suboxide,
  - wherein the shell includes a second graphene,
  - wherein at least one of the first graphene and the second graphene includes at least one element selected from nitrogen (N), phosphorus (P), and sulfur (S), The silicon-containing composite may be porous.

The silicon suboxide may be present in a form of a film, a matrix, or a combination thereof. Also, the first graphene and the second graphene are each independently in a form of a film, a particle, a matrix, or a combination thereof.

The term "matrix" represents a three-dimensional space and the term "membrane" represents a two-dimensional space compared to a matrix.

In various embodiments, the second graphene may be epitaxially grown on a surface of the silicon suboxide of the porous silicon composite secondary particle In an embodiment, the first graphene may be epitaxially grown from the surface of the silicon suboxide, and the second graphene may be epitaxially grown from the surface of the porous silicon composite secondary particle.

The silicon-containing composite may be porous. As used herein, the term "cluster" refers to an aggregate of two or more primary particles, and may be construed as having substantially the same meaning as a "secondary particle."

As used herein, the term "graphene" refers to a structure having the form of a flake, a nanosheet, or a layer (e.g., film), wherein the nanosheet may refer to a structure disposed in an irregular manner on a surface of silicon suboxide or on a surface of the porous silicon composite secondary particle, and the layer may refer to a structure disposed as a continuous and uniform film of graphene on a silicon suboxide or on the porous silicon secondary particle. As such, the graphene may have a structure including distinct layers or a structure without any distinct layers.

As used herein, the term "silicon suboxide" refers to a compound of the Formula SiOx, wherein $0<x<2$.

As used herein, the term "silicon suboxide-like" refers to a mixture of compounds that may include at least one of Si and $SiO_2$, so as to have an average composition represented by the Formula SiOx, wherein $0<x<2$.

In an embodiment, the core of the silicon-containing composite may have a size of about 3 micrometers (μm) to about 10 μm, or about 3 μm to about 9 μm, or about 5 μm to about 10 μm, and the shell may have a thickness of about 10 nanometers (nm) to about 5,000 nm, or about 10 nm to about 2500 nm, and in another embodiment, about 10 nm to about 1,000 nm. Here, the size means either the diameter of the length of the major axis.

FIG. 1A illustrates a silicon-containing composite 11 according to an embodiment.

Referring to FIG. 1A, the silicon-containing composite 11 includes a core 1 including a porous silicon composite secondary particle and a shell 2 disposed on and surrounding the core 2, the shell including a second graphene 10*b*.

The porous silicon composite secondary particle may include an aggregate of silicon composite primary particles 10, and the silicon composite primary particle may include silicon, a silicon suboxide of the Formula SiOx (wherein $0<x<2$), on a surface of the silicon, and a first graphene 10*a* on a surface of the silicon suboxide. In the silicon composite primary particle, the first graphene may form a shell on a surface of the silicon suboxide, and in the silicon composite secondary particle, the second graphene may form a shell on a surface of the core, resulting in a core/shell structure of the porous silicon composite cluster. Such a core/shell structure may suppress volume expansion of the silicon primary particles and inhibit side reactions that may occur with an electrolyte. Thus the silicon-containing composite comprises a first core/shell structure and a second core/shell structure, in which the first core/shell structure includes the porous core comprising the porous silicon composite secondary particle and the shell comprising the second graphene on the surface of the porous core, and the second core/shell structure comprises a core comprising the silicon and the silicon suboxide on a surface of the silicon, and the shell comprises the first graphene on a surface of the silicon suboxide.

The first graphene 10*a* may include a plurality of graphene layers. The number of graphene layers included in the first graphene 10*a* of the core 1 may be the same as or different from the number of graphene layers included in the second graphene 10*b* of the shell 2.

In an embodiment, the second graphene 10*b* of the shell 2 may have a density which is greater than the density of the first graphene 10*a* of the core 1. In one another embodiment, the number of graphene layers included in the first graphene 10*a* of the core 1 may be an integer of about 1 to about 30, or about 2 to about 20, or in another embodiment, about 5 to about 15, and in still another embodiment, about 10. The number of graphene layers included in the second graphene 10*b* of the shell 2 may be an integer of about 1 to about 50, or about 10 to about 40, or in another embodiment, about 20 to about 30.

In an embodiment, the first graphene 10*a* and the second graphene 10*b* may each be doped with at least one element (dopant) selected from nitrogen (N), phosphorus (P), and sulfur (S).

In an embodiment, an amount of at least one element selected from N, P, and S in the silicon-containing composite may be about 0.2 atomic percent (atomic %) or less, or about 0.1 atomic % or less, or about 0.08 atomic % or less, and in another embodiment, about 0.05 atomic % to about 0.2 atomic %, or about 0.08 atomic % to about 0.2 atomic %, or about 0.1 atomic % to about 0.2 atomic %, at a surface depth of about 10 nm or less, as measured by X-ray photoelectron spectroscopy (XPS) analysis. Here, the surface depth may be from about 1 nm to about 10 nm, or about 2 nm to about 10 nm, or for example, about 5 nm to about 10 nm.

In an embodiment, an amount of the at least one element selected from N, P, and S may be from about 2,000 parts per million (ppm) or less, or about 1,500 ppm or less, or about 1,000 ppm or less, and in another embodiment, about 50 ppm to about 2,000 ppm, and in still another embodiment, about 500 ppm to about 2,000 ppm.

Figure 1B:
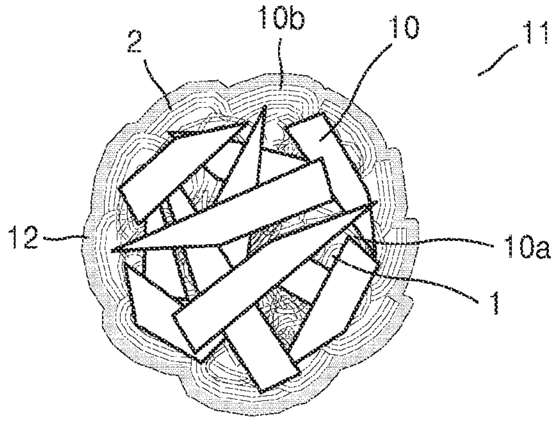
FIG. 1B is a schematic view that illustrating a structure of a silicon-containing composite according to another embodiment.

FIG. 1B illustrates a porous silicon composite 11 according to another embodiment.

Referring to FIG. 1B, the silicon-containing composite 11 includes a structure in which a carbonaceous coating layer 12 is additionally disposed on the surface of the porous silicon composite 11 of FIG. 1A. The carbonaceous coating layer 12 may include amorphous carbon, crystalline carbon, or a combination thereof. The carbonaceous coating layer may also include at least one element selected from N, P, and S, in the same manner as in the first graphene 10*a* and the second graphene 10*b*.

In an embodiment, the at least one element selected from N, P, and S may not be included in the first graphene and the second graphene of the porous silicon composite 11, but may be included only in the carbonaceous coating layer of the porous silicon composite 11.

Figure 2:
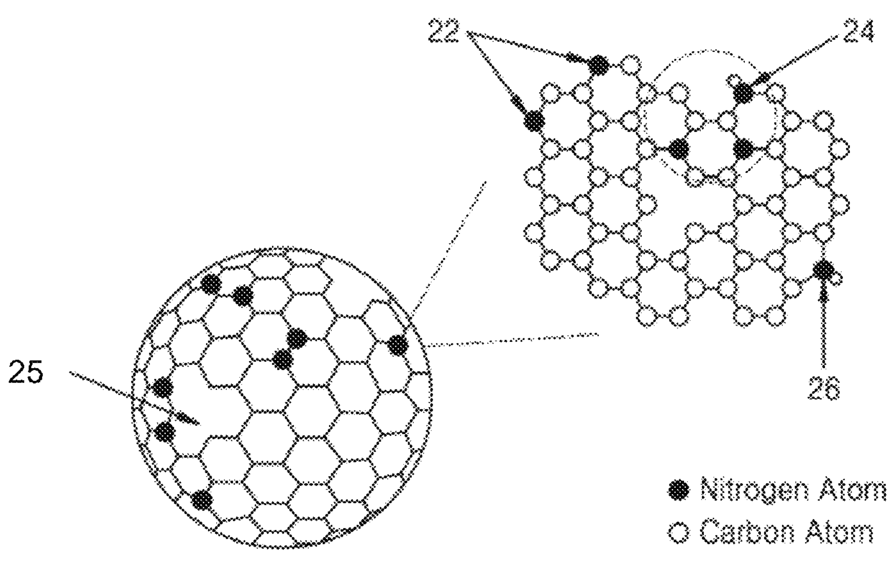
FIG. 2 is a diagram illustrating an embodiment of a method of doping nitrogen in a silicon-containing composite.

The effect of the case in which N is included in the silicon-containing composite will now be described with reference to FIG. 2.

Without being limited by theory, it is understood that during the preparation of the silicon-containing composite cluster, the graphene may include a defective region 25 and consequently may have poor conductivity. When such graphene is used as an electrode material, a solid electrolyte interphase (SEI) layer may be more easily formed. As shown in FIG. 2, when N is included and incorporated into a defective region 25 of graphene, the stability and quality of graphene may be further improved. Here, N may be introduced to a pyridinic N position 22, a quaternary N position 24, a pyrrolic N position 26, and the like, thereby further improving the quality of graphene.

In addition, when N is introduced to a defective region 25 of the graphene, an electrode material including such a structure may efficiently suppress the formation of the SEI layer.

In an embodiment, the silicon-containing composite may further include an outer layer having a density greater than the density of the core 1. The outer layer may have a thickness of about 20 nm to about 60 nm, or about 20 nm to about 50 nm, or about 30 nm to about 40 nm. However, embodiments are not limited thereto.

In an embodiment, an intensity ratio of peak D to peak G (Id/Ig) in the silicon-containing composite may be from about 0.8 to about 1.5, in another embodiment, about 1 to about 1.4, in still another embodiment, about 1.1 to about 1.3 (for example, about 1.2), as measured by Raman spectroscopy analysis.

In an embodiment, a 20% weight loss temperature of the silicon-containing composite may be greater than a 20% weight loss temperature of a silicon-containing composite not including the at least one elements selected from N, P, and S, as measured by thermogravimetric analysis. For example, a 20% weight loss temperature of the silicon-containing composite may be about 7° C. to 15° C. greater than a 20% weight loss temperature of a silicon-containing composite which does not comprise the at least one element selected from nitrogen, phosphorous, and sulfur as measured by thermogravimetric analysis.

When the silicon-containing composite does not include N, the 20% weight loss temperature may be, for example, about 710° C. to about 730° C.

The core and the shell of the silicon-containing composite may each further include graphite.

The ratio of the diameter of the porous silicon composite secondary particle to the diameter of the silicon-containing composite 11 may be from about 1:1 to about 1:30, and in another embodiment, about 1:1 to about 1:25, or about 1:1 to about 1:22, and in still another embodiment, about 1:21. The ratio of the diameter of the porous silicon composite secondary particle to the silicon-containing composite may be a diameter ratio when the porous silicon composite secondary particle and the porous silicon composite 11 both have a spherical shape. When the porous silicon composite secondary particle and the silicon-containing composite are both non-spherical in shape, the diameter ratio refers to a length ratio of the major axis.

In another embodiment, the core of the silicon-containing composite 11 may have a diameter of about 3 micrometers (μm) to about 10 μm, or about 3 μm to about 9 μm, or about 2.5 μm to about 7.5 μm. The thickness of the shell of the silicon-containing composite may be about 10 nanometer (nm) to about 5,000 nm (i.e., about 0.01 μm to about 5 μm), or about 10 nm to about 2,500 nm, for example, about 10 nm to about 1,000 nm. The ratio of the diameter of the core 1 to the thickness of the shell 2 (e.g., a carbon coating layer) of the porous silicon composite 11 may be from about 1:0.001 to about 1:1.67, or about 1:0.005 to about 1:1.67 or about 1:0.0033 to about 1:1.67, and may be, for example, about 1:0.001, about 1:0.0033, about 1:0.5, or about 1:1.67.

The total amount of the first graphene and the second graphene in the silicon-containing composite may be from about 0.1 parts by weight to about 2,000 parts by weight, and in an embodiment, about 0.1 parts by weight to about 300 parts by weight, and in another embodiment, about 0.1 parts by weight to about 90 parts by weight, an in still another embodiment, about 5 parts by weight to about 30 parts by weight, based on 100 parts by weight of the silicon. When the total amount of the first graphene and the second graphene is within these ranges, volume expansion of the silicon of the porous silicon composite may be effectively suppressed, and improved conductivity of the porous silicon composite may be obtained.

In the silicon composite primary particle, the first graphene may be spaced apart from a surface of the silicon suboxide having the Formula SiOx (wherein $0<x<2$), by a distance of about 10 nm or less, or about 8 nm or less, or about 5 nm or less. The first graphene may include at least 1 to 30 graphene layers, or about 1 to 25 graphene layers, or about 1 to about 20 graphene layers, and may have a total thickness of about 0.3 nanometers to about 1000 nanometers, for example, for example, about 0.3 nm to about 50 nm, for example, about 0.6 nm to about 50 nm, for example, about 1 nm to about 30 nm. The first graphene may be oriented at an angle of about 0% to about 90% with respect to a major axis of the silicon. Here, the major axis refers to a Y-axis.

Figure 1C:
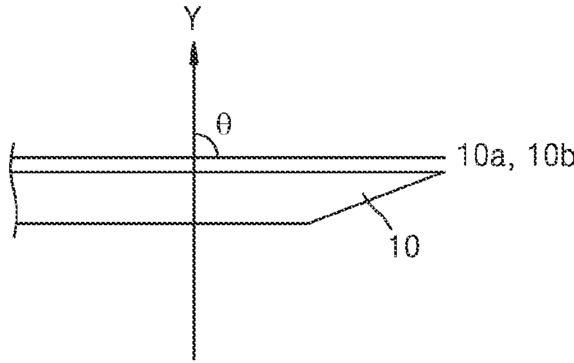
FIG. 1C is a diagram illustrating a method of stacking graphene on silicon, which includes a silicon suboxide on its surface, in a silicon-containing composite according to an embodiment.

As shown in FIG. 1C, the first graphene and the second graphene 10*a*,10*b* may be oriented on the surface of the silicon oxide at an angle θ of about 90% with respect to a major axis (i.e., Y-axis) of the plate-like and needle-like silicon composite primary particles 10, and may be directly on the surface of the silicon suboxide.

In the silicon-containing composite, the second graphene may extend from a surface of the silicon suboxide by a distance of about 1,000 nm or less, for example, about 500 nm or less, and in an embodiment, about 10 nm or less, and in an embodiment, about 1 nm or less, and in another embodiment, about 0.00001 nm to about 1 nm. The second graphene may include about 1 to about 30, or about 1 to about 25, or about 1 to about 20 graphene layers. In the silicon-containing composite, the second graphene may have a total thickness of about 0.6 nm to about 50 nm, or about 0.8 nm to about 50 nm, or in an embodiment, about 1 nm to about 50 nm, and may be oriented at an angle of about 0% to about 90% with respect to a major axis of the silicon.

The silicon suboxide having the Formula SiOx (wherein 0<x<2), may have a thickness of about 30 μm or less, or about 1 μm or less, or about 100 nm or less, and for example, about 10 nm.

The shape of the silicon is not limited to any specific form, and may be in the form of, for example, a sphere, a nanowire, a needle, a rod, or a combination thereof. The silicon may have an average diameter of about 10 nm to about 40 μm, or about 20 nm to about 10 μm, or about 50 nm to about 1 μm, for example about 100 nm.

The porous silicon composite secondary particle may have an average particle diameter (D50) of about 200 nm to about 50 μm, and in an embodiment, about 1 μm to about 30 μm, and in another embodiment, about 1 μm to about 10 μm, and in still another embodiment, about 3 μm to about 5 μm. The porous silicon composite secondary particle may have a specific surface area of about 0.1 square meters per gram ($m^2/g$) to about 100 $m^2/g$, or about 1 $m^2/g$ to about 50 $m^2/g$, and in an embodiment, about 1 $m^2/g$ to about 30 $m^2/g$. The porous silicon composite secondary particle may have a density of about 0.1 grams per cubic centimeter (g/cc) to about 2.8 g/cc, for example, about 0.5 g/cc to about 2 g/CC.

The silicon-containing composite may further include a carbonaceous coating layer on a surface thereof, the carbonaceous coating layer including an amorphous carbon. When the silicon-containing composite includes a carbonaceous coating layer, a lithium battery including the silicon-containing composite may have improved lifetime characteristics, though initial efficiency may be reduced.

In the same manner as the first graphene and the second graphene, the carbonaceous coating layer may also include at least one element selected from N, P, and S. A method of including the at least one element selected from N, P, and S in the carbonaceous coating layer may be applicable in various ways.

The carbonaceous coating layer may have a thickness of, for example, about 10 nm to about 5,000 nm, or about 10 nm to about 3,000 nm, or about 20 nm to about 1,500 nm.

The amorphous carbon may include pitch carbon, soft carbon, hard carbon, mesophase carbon pitch carbide, sintered coke, carbon fiber, or a combination thereof.

The carbonaceous coating layer including amorphous carbon may further include a crystalline carbon, and the crystalline carbon may include a fullerene, natural graphite, artificial graphite, graphene, a carbon nanotube, or a combination thereof.

The carbonaceous coating layer may be a non-porous continuous coating layer, and may have a thickness of about 1 nm to about 5,000 nm, or about 5 nm to about 2,500 nm, or about 10 nm to about 1,000 nm. The carbonaceous coating layer may include, for example, a first carbonaceous coating layer, which includes the amorphous carbon, and a second carbonaceous coating layer, which includes the crystalline carbon.

The silicon-containing composite may have a narrow particle size distribution. For example, the silicon-containing composite may have a D50 particle size of about 1 μm to about 30 μm, a D10 particle size of about 0.001 μm to about 10 μm, and a D90 particle size of about 10 μm to about 30 μm. As used herein, the term "D50 particle size" refers to a particle diameter corresponding to 50% of the particles in a cumulative distribution curve in which particles are accumulated in the order of particle diameter from the smallest particle to the largest particle and a total number of accumulated particles is 100%. Similarly, the terms "D10" and "D90" respectively indicate particle diameters corresponding to 10%, and 90% of the particles in the cumulative distribution curve of the porous silicon secondary particle, respectively.

The silicon-containing composite according to an embodiment may have a narrow particle size distribution within these ranges. Unlike the silicon-containing composite according to an embodiment, silicon composite secondary particles, which are aggregates of silicon composite primary particles, may have an irregular secondary particle size distribution, and thus it may be difficult to control the particle size distribution of the negative active material so as to improve the cell performance.

The amount of oxygen atoms in the porous silicon composite may be from about 0.01 atomic % to about 15 atomic %, and in an embodiment, about 3.5 atomic % to about 5 atomic %, and in another embodiment, about 3.5 atomic % to about 3.8 atomic %. Without being limited by theory, it is understood that the advantages associated with such a small amount of oxygen in the porous silicon composite cluster, as compared with that of conventional silicon-based materials, are attributed to the suppressed oxidation of silicon due to the use of a dispersing agent (e.g., stearic acid) in preparing the porous silicon composite cluster. Such a reduced amount of oxygen in the silicon-containing composite may improve silicon capacity and initial efficiency.

The production of conventional graphene-grown silicon primary particles, a negative electrode including the conventional graphene-grown silicon primary particles, and the state of the negative electrode after charging and discharging, will now be described. The conventional graphene-grown silicon primary particles including graphene directly grown on silicon particles have a structure including a first graphene on needle-like silicon particles. A negative electrode may be manufactured by forming a negative active material layer including a mixture of the conventional graphene-grown silicon primary particles and graphite on a copper current collector.

After charging and discharging of the negative electrode, due to the volume expansion and contraction of silicon, the graphene-grown silicon primary particles acting as an active material may become separated, and consequently, isolation of the silicon may occur, leading to reduced capacity. Furthermore, continuous growth of a solid electrolyte interphase (SEI) layer on the surface of the silicon primary particles may also occur, leading to increased lithium consumption and reduced durability against charging and discharging.

The inventors have advantageously discovered that a negative electrode having improved durability over multiple charging and discharging cycles may be obtained by using a silicon-containing composite having a double core/shell structure. Without being limited by theory, it is believed that the double core/shell structure may form a uniform charging and discharging network that suppresses disintegration caused by the volume expansion and contraction of silicon during charging and discharging, and which may ensure formation of a stable SEI layer on the surface of the porous silicon composite cluster.

In addition, silicon having a diameter of about 100 nm or more, for example, about 150 nm or more, and for example, about 100 nm to about 200 nm may be used for preparing a silicon-containing composite including doped (e.g., N-doped) graphene on a silicon/silicon suboxide.

The silicon-containing composite according to an embodiment may have excellent capacity characteristics with a capacity range of about 600 milliampere hours per cubic centimeter (mAh/cc) to about 2,000 mAh/cc, or about 750 mAh/cc to about 2,000 mAh/cc, or about 1,000 mAh/cc to about 2,000 mAh/cc.

According to another aspect, a silicon-containing composite includes: a core including a porous silicon composite secondary particle; and a shell disposed on and surrounding the core, wherein the porous silicon composite secondary particle includes an aggregate of silicon composite primary particles, each including a silicon suboxide, a thermal treatment product of the silicon suboxide, or a combination thereof; and a first graphene disposed on a surface of the silicon suboxide, the thermal treatment product of the silicon suboxide, or the combination thereof, and wherein the shell includes a second graphene, and at least one of the first graphene and the second graphene includes at least one element selected from N, P, and S.

As used herein, the term "thermal treatment product of a silicon suboxide" refers to a product obtained by thermally treating the silicon suboxide having the Formula SiOx (wherein $0<x<2$). The thermal treatment may be a thermal treatment capable of facilitating the growth of graphene on the surface of the silicon suboxide. In an embodiment, the thermal treatment include a vapor deposition reaction, in which a gas including a carbon source gas or a mixture of a carbon source gas and a reducing gas may be used as the graphene source. For example, the reducing gas may be hydrogen.

The thermal treatment product of the silicon suboxide having the Formula SiOx (wherein $0<x<2$), may be a product obtained by thermally treating the silicon suboxide in an atmosphere including a carbon source gas or a combination of a carbon source gas and a reducing gas.

The thermal treatment product of the silicon suboxide having the Formula SiOx (wherein $0<x<2$) may have, for example, a structure including silicon (Si) arranged in a matrix of a silicon oxide of the Formula $SiO_y$ (wherein $0<y\leq 2$).

In an embodiment, the thermal treatment product of the silicon suboxide of the Formula SiOx (wherein $0<x<2$) may have, for example, i) a structure including silicon (Si) arranged in a matrix of $SiO_2$, ii) a structure including silicon (Si) arranged in a matrix including $SiO_2$ and $SiO_x$ (wherein $0<x<2$), or iii) a structure including silicon (Si) arranged in a matrix of $SiO_y$ (wherein $0<y<2$). Put another way, the thermal reaction product of the silicon suboxide includes silicon in a matrix comprising $SiO_2$, $SiO_y$, wherein $0<y<2$, or a combination thereof.

In an embodiment, an amorphous carbon layer may be between the first graphene and the silicon suboxide, the thermal treatment product of the silicon suboxide, or the combination thereof. In another embodiment, an amorphous carbon layer may be between the second graphene and the core including the porous silicon composite secondary particle. The amorphous carbon layer may serve as a graphene-growing nucleus facilitating the growth of graphene on the surface of the silicon suboxide and the surface of the core.

In an embodiment, a carbide such as a silicon carbide (SiC) is not present between the silicon and the silicon suboxide and/or between the silicon suboxide and the graphene. A carbide, for example a silicon carbide, does not react with lithium so that, when used as an electrode material, an electrode may have a reduced capacity. In addition, in order to form graphene on a surface of the silicon carbide, a high temperature is required, resulting in increased crystallinity of the silicon and accordingly, an accelerated pulverization phenomenon during charging and discharging of lithium.

An embodiment of a method of preparing a porous silicon composite according to one of the above-described embodiments will now be described with reference to FIG. 3.

First, a structure including silicon and a silicon suboxide having the Formula SiOx (wherein $0<x<2$) on a surface of the silicon may be disintegrated to obtain a disintegrated silicon primary particle.

Figure 3:
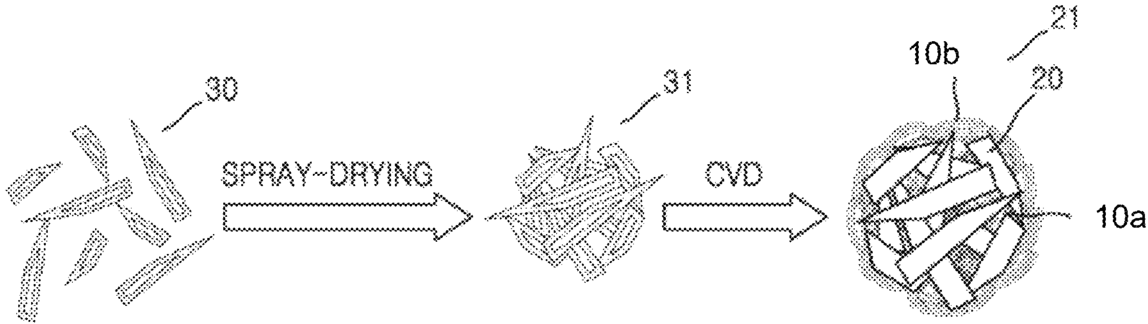
FIG. 3 is a diagram illustrating an embodiment of a method of preparing a silicon-containing composite.

The disintegrated silicon primary particle may be mixed with a dispersing agent and a solvent to thereby obtain a composition 30, see FIG. 3. Next, a porous silicon composite secondary particle 31 may be prepared from the composition 30 by, for example, spray drying the composition 30.

The porous silicon composite secondary particle 31 may have a porosity of, for example, about 0.1% to about 50%, and a pore size of, for example, about 10 nm to about 500 nm. As used herein, the term "porosity" is used to refer to a measure of the empty space (voids or pores) in a material and is determined as a percentage of the volume of voids in a material based on the total volume of the material.

The preparing of the porous silicon secondary particle 31 from the composition 30 may be performed by any suitable method, for example, co-precipitation, spray drying, or a solid phase method. For example, the porous silicon composite secondary particle may be prepared by spray drying. When the porous silicon composite secondary particle 31 is prepared by spray drying, a particle diameter may be controlled by appropriately choosing a spraying type, a pressurized gas supply rate, a composition supply rate, a drying temperature, and the like.

In an embodiment, the spray drying may be performed at an atmospheric temperature of about room temperature (25° C.) to about 500° C., for example, about 50° C. to about 300° C. When the spray drying is performed within these temperature ranges, particle agglomeration and blocking of a particle discharge outlet may be prevented, due to moisture condensation near the particle discharge outlet, and the porous silicon composite secondary particles may have appropriate porosity.

In the spray drying, a spraying pressure may be about 1 bar to about 5 bar.

Prior to the spray drying, a surface area of the silicon primary particle 31 may be increased, for example, by pulverization. To this end, pulverized silicon primary particles may be used as the starting material.

For example, when formed by spray drying, the obtained porous silicon composite secondary particles 31 may be spherical in shape. A dispersing agent, for example, stearic acid, may partially remain on a portion of a surface of the porous silicon secondary particle 31. The spray drying nozzle size is about 50 μm to about 1,000 μm, for example, about 150 μm.

Afterwards, while a carbon source gas and at least one precursor selected from a N precursor, a P precursor, and a S precursor are supplied to the porous silicon secondary particle 31, the porous silicon composite secondary particle 31 may be thermally treated to thereby prepare the porous silicon composite 21, see FIG. 3. In FIG. 3, reference numeral **10*a* denotes a first graphene, reference numeral 10*b* denotes a second graphene, and reference numeral 20** represents a silicon composite primary particle. As such, the at least one of the N precursor, the P precursor, and the S precursor may be provided to the porous silicon composite secondary particle using the existing carbon source gas. In this regard, the preparation process of the target product may be simplified and easy. A mixing ratio of the at least one precursor selected from the N precursor, the P precursor, and the S precursor to the carbon source gas may be controlled by adjusting the volume of each precursor and the volume of the carbon source gas.

In an embodiment, an amount of the at least one precursor selected from the N precursor, the P precursor, and the S precursor may be about 20 volume % or less, or about 15 volume % or less, or about 10 volume percent or less, for example, about 5 volume % to about 20 volume %, or about 5 volume % to about 15 volume %, or about 5 volume % to about 10 volume %, based on the total amount of the reaction gas. When the amount of the at least one precursor selected from the N precursor, the P precursor, and the S precursor is within these ranges, the crystallinity and quality of graphene may be excellent.

The carbon source gas may fill the pores in the porous silicon composite secondary particles and then carbon grows on surfaces of the silicon composite secondary particles.

The solvent may include an alcohol, for example, ethanol, methanol, or isopropyl alcohol, or a combination thereof. When these alcoholic solvents are used, the dispersing agent may be removed as the solvent is removed, so that the amount of the dispersing agent remaining in the silicon-containing composite may be reduced. As a result, an amount of oxygen may be reduced in the silicon-containing composite and thus only a small amount of oxygen may remain.

The dispersing agent may uniformly disperse the silicon primary particles. The dispersing agent may include, but is not limited to, stearic acid, resorcinol, polyvinyl alcohol, pitch, or a combination thereof. An amount of the dispersing agent may be about 1 part by weight to about 15 parts by weight, or about 2.5 parts by weight to about 12 parts by weight, for example, about 5 parts by weight to about 10 parts by weight, based on 100 parts of a total weight of the composition. When the amount of the dispersing agent is within these ranges, silicon and graphene may be uniformly dispersed without agglomerating.

The carbon source gas may include a compound represented by Formula 1, a compound represented by Formula 2, an oxygen-containing gas represented by Formula 3, or a combination thereof:

$$C_nH_{(2n+2-a)}[OH]_a \quad \text{[Formula 1]}$$

wherein, in Formula 1, n may be an integer of 1 to 20, and a may be 0 or 1, $$C_nH_{(2n)} \quad \text{[Formula 2]}$$

wherein, in Formula 2, n may be an integer of 2 to 6, $$CxHyOz \quad \text{[Formula 3]}$$

wherein, in Formula 3, x may be 0 or an integer of 1 to 20, y may be 0 or an integer of 1 to 20, and z may be 1 or 2.

The carbon source gas may include, for example, methane, ethylene, propylene, methanol, ethanol, propanol, or a combination thereof.

The thermal treatment may be performed at a temperature of about 600° C. to about 1,100° C., or about 650° C. to about 1,000° C., and in an embodiment, about 700° C. to about 1,000° C. When the thermal treatment is performed within these temperature ranges, graphene may be generated at a high density in the core and shell.

As described above, the silicon composite primary particles may include silicon, the silicon suboxide of the Formula SiOx (wherein 0<x<2) on a surface of the silicon, and graphene on a surface of the silicon suboxide. The silicon suboxide of the Formula SiOx (wherein 0<x<2) is an unstable oxygen-deficient material as compared with silicon oxide ($SiO_2$), and tends to form a stable material by reacting with another reactive material, such as a carbon source gas. Based on this tendency of the silicon oxide, the silicon suboxide of the Formula $SiO_x$ (wherein 0<x<2) may be used as a seed layer for forming graphene.

A thickness of the silicon suboxide of the Formula $SiO_x$ (wherein 0<x<2) disposed on the surface of the silicon may affect a shape and/or a structure of the graphene. The silicon suboxide has a layer form.

The thickness of the silicon suboxide ($SiO_x$, wherein 0<x<2) film may be determined by controlling a process involved in graphene formation, for example, by controlling the composition of the carbon source gas used to form the graphene. The thickness of the silicon suboxide ($SiO_x$, wherein 0<x<2) film may be about 300 μm or less, or about 250 μm or less, or about 150 μm or less.

In an embodiment, the silicon suboxide ($SiO_x$, wherein 0<x<2) film in the silicon-containing composite for use in a battery may have a thickness of about 10 nm or less, and in another embodiment, about 0.1 nm to about 10 nm, or about 0.1 nm to about 7.5 nm, or in still another embodiment, about 0.1 nm to about 5 nm. In an embodiment, the distance may be for example, about 5 nm or less, for example about 1 nm or less, for example, about 0.0001 nm to 1 nm.

When the thickness of the silicon suboxide ($SiO_x$, wherein 0<x<2) film is within these ranges, a battery manufactured using the silicon-containing composite including the silicon suboxide ($SiO_x$, wherein 0<x<2) film may have improved capacity.

In an embodiment, the graphene may be formed as a coating on a surface of the silicon suboxide of the Formula $SiO_x$ (wherein 0<x<2) by non-catalytic vapor carbon deposition.

The vapor carbon deposition may include thermally treating the silicon covered with the silicon suboxide of the Formula $SiO_x$ under a mixed gas atmosphere, the atmosphere including a compound represented by Formula 1, a compound represented by Formula 2, an oxygen-containing gas represented by Formula 3, or a combination thereof, and at least one precursor selected from the N precursor, the P precursor, and the S precursor.

$$C_nH_{(2n+2-a)}[OH]_a \quad \text{[Formula 1]}$$

wherein, in Formula 1, n may be an integer of 1 to 20, and a may be 0 or 1, $$C_nH_{(2n)} \quad \text{[Formula 2]}$$

wherein, in Formula 2, n may be an integer of 2 to 6, $$CxHyOz \quad \text{[Formula 3]}$$

wherein, in Formula 3, x may be 0 or an integer of 1 to 20, y may be 0 or an integer of 1 to 20, and z may be 1 or 2.

While not limited to this theory, it is understood that coating with the graphene by the above-described vapor carbon deposition is associated with reforming of the silicon suboxide of the Formula $SiO_x$ covering the silicon by using $CO_2$ in the gas mixture.

According to the vapor carbon deposition, graphene may be directly grown on the silicon which is covered with silicon suboxide of the Formula $SiO_x$, and thus the silicon and graphene may be strongly adhered to each other.

In an embodiment, even when a $SiO_x$ layer is not present on the silicon, by a process of reacting a carbon-containing mixed gas and an oxygen-containing mixed gas, a $SiO_x$ layer may be formed first on the surface of the silicon by a reaction between the silicon and the oxygen-containing mixed gas, and then graphene may be formed thereon by a reaction with the carbon-containing mixed gas. Here, a degree of adhesion between the silicon and the graphene may be evaluated by measuring a distance between them by using a scanning electron microscope (SEM)

The first graphene of the silicon composite primary particle constituting the silicon-containing composite may be spaced apart (extend from) the silicon of the silicon suboxide by a distance of about 10 nm or less, or about 5 nm or less, or about 1 nm or less, for example, about 0.5 nm to about 10 nm, or about 0.5 nm to about 7.5 nm, or about 0.5 nm to about 5 nm. In an embodiment, the first graphene may be spaced apart from (extend from) the silicon by a distance about 1 nm or less, or about 0.8 nm or less, or about 0.6 nm or less, for example, about 0.5 nm to about 1 nm, or about 0.5 nm to about 0.8 nm, or about 0.5 nm to about 0.75 nm. The first graphene may be oriented at an angle of about 0% to about 90% with respect to a major axis of the silicon. The first graphene may include about 1 to about 20, or about 1 to about 15, or about 1 to about 10 graphene layers, and may have a total thickness of about 0.6 nm to about 12 nm, or about 1 nm to about 10 nm, or about 1 nm to about 7.5 nm. The first graphene may be oriented at an angle of 0% to about 90% with respect to the major axis of the silicon.

The shape of the silicon may not be limited to any specific shape and, for example, may have the form of a sphere, a nanowire, a needle, a rod, a particle, a nanotube, a nanorod, a wafer, a nanoribbon, or a combination thereof.

In an embodiment, the silicon may be in the form of needle-like particles. For example, the needle-like silicon particles may have a length of about 100 nm to about 160 nm, or about 105 nm to about 150 nm, and in some embodiments, about 108 nm to about 125 nm; and may have a thickness of about 10 nm to about 100 nm, or about 15 nm to about 75 nm, and in some embodiments, about 20 nm to about 50 nm, and in some other embodiments, about 40 nm.

In an embodiment, the silicon suboxide ($SiO_x$, wherein $0<x<2$) film may be formed on a surface of silicon having a needle-like shape, and the graphene may be formed on a surface of the silicon suboxide.

In another embodiment, the silicon suboxide ($SiO_x$, wherein $0<x<2$) may be formed on silicon nanoparticles, and the graphene may be formed on the silicon suboxide. The silicon nanoparticles may have an average particle diameter of about 40 nm to about 40 μm, or about 40 nm to about 1 μm, for example, about 40 nm to about 100 nm.

When the silicon has a form of a wafer, the silicon wafer may have a thickness of about 2 mm or less, or about 1 mm or less, or about 0.5 mm or less, or about 0.1 mm or less, for example, about 0.001 mm to about 2 mm, or about 0.001 mm to about 1 mm, or about 0.005 mm to about 0.5 mm.

The graphene is a polycyclic aromatic molecule comprising a plurality of carbon atoms covalently bonded to one another. The covalently bonded plurality of carbon atoms form a 6-membered ring as a basic repeating unit, but a 5-membered ring and/or a 7-membered ring may be included in the graphene. Accordingly, the graphene may be a single layer of the covalently bonded carbon atoms (in general, having a $sp^2$ bond). The graphene may include a single layer or a plurality of layers stacked upon one another, for example, one layer to about 100 layers, about 2 layers to about 100 layers, or about 3 layers to about 50 layers.

The graphene may have a structure of a nanosheet, a layer (or film), a flake, or a combination thereof. The term "nanosheet" refers to a material having a two-dimensional structure in the form of a sheet having a thickness of less than about 1000 nanometers (nm), or a thickness in a range of about 1 nm to about 1000 nm, and which is disposed in an irregular manner on the silicon suboxide or on the porous silicon secondary composite particle. As used herein, the term "layer" "film" refers to a continuous, uniform layered structure of graphene formed on the silicon suboxide or on the porous silicon secondary composite particle.

In an embodiment, the silicon-containing composite may further include a metal oxide or a metal fluoride. When the silicon-containing composite further includes a metal oxide or a metal fluoride, formation of an SEI layer may be prevented due to suppression of a side reaction.

The metal oxide may include a magnesium oxide, a manganese oxide, an aluminum oxide, a titanium oxide, a zirconium oxide, a tantalum oxide, a tin oxide, a hafnium oxide, or a combination thereof. The metal fluoride may include an aluminum fluoride ($AlF_3$). A combination comprising at least one of the foregoing may also be used.

In an embodiment, graphene in the silicon-containing composite may serve as an SEI stabilization clamping layer. The silicon-containing composite may have a large specific surface area, and thus may prevent a reduction in initial efficiency and volume energy density of a battery when used in the battery.

The graphene in the silicon-containing composite may suppress disintegration or pulverization of active materials such as silicon, and may improve conductivity of the silicon-containing composite. The graphene may suppress disintegration or pulverization of silicon particles. The graphene may serve as a clamping layer which prevents disintegration of silicon particles, while also allowing for an alloying reaction between lithium ions and silicon (Si) to thereby yield a significant specific capacity and provide a continuous conduction pathway between the particles.

The graphene layers may slide over each other when the silicon particles swell during charging, and then slide back to their relaxed positions during delithiation. Without being limited by theory, it is understood that this movement occurs because the van der Waals force is greater than the force of friction between the layers.

The clamping effect of the graphene layers, which prevents disintegration of silicon particles and allows the graphene layers to serve as a clamping layer, may be confirmed by evaluating whether the graphene layers remain the same (are unaffected) after about 200 repeated lithiation/delithiation cycles.

In an embodiment, the silicon-containing composite may include nanosized pores between closely compacted graphene on the silicon composite primary particles, the pores serving as a buffer during the volume expansion of the primary and secondary particles. An SEI layer may also be stably grown on the primary particles through thermal treatment. The graphene layers on the secondary particles may slide over one another, expanding their volume while the volume expansion and contraction of silicon occurs, to thereby prevent the primary particles from being exposed to the environment outside of the secondary particles, and thus suppress contact between the silicon composite primary particles and an electrolyte.

According to another aspect, a carbon composite includes a silicon-containing composite according to any of the above-described embodiments and a carbonaceous material. A silicon-containing composite according to any of the embodiments may have a reduced specific surface area and an increased volume density (specific capacity), as compared with silicon composite primary particles, and thus may improve volume energy density and further reduce volume expansion of an electrode when mixed with a carbonaceous material.

The carbon composite may further improve initial efficiency, specific capacity characteristics, rate capability, and durability, as compared to when the silicon-containing composite is used alone (without the carbonaceous material coating).

In an embodiment, an amount of the carbonaceous material may be about 0.001 parts to about 99 parts by weight, and in another embodiment, about 10 parts to about 97 parts by weight, and in another embodiment, about 50 parts to about 97 parts by weight, based on 100 parts by weight of the carbon composite.

The carbonaceous material may include graphene, graphite, a fullerene, a carbon fiber, a carbon nanotube, or a combination thereof.

In an embodiment, the carbon composite may include, for example, graphite and the silicon-containing composite formed on the graphite.

The graphite may be, for example, $SFG_6$ graphite (TIMREX®), and may have an average particle diameter of about 6 μm. When an electrode is formed using the carbon composite, an amount of the carbon composite in the electrode may be, for example, about 65 parts to 100 parts by weight, or about 65 parts to about 90 parts by weight, or from about 68 parts to about 87 parts by weight, and an amount of a binder may be, for example, about 10 parts by weight to about 50 parts by weight, or about 12 parts to about 40 parts by weight, or from about 13 parts to about 32 parts by weight. For example, an amount of the graphite in the carbon composite may be, for example, about 0.5 part to about 30 parts by weight, or about 1 part to about 25 parts by weight, or 1 part to about 20 parts by weight based on 100 parts by weight of the carbon composite.

The binder may be, for example, lithium polyacrylate.

The compound represented by Formula 1 and the compound represented by Formula 2 may each independently be methane, ethylene, propylene, methanol, ethanol, propanol, or a combination thereof.

The oxygen-containing compound represented by Formula 3 may include, for example, carbon dioxide ($CO_2$), carbon monoxide (CO), water vapor ($H_2O$), or a combination thereof.

The N precursor may be, for example, ammonia.

Examples of the S precursor may include sulfur powder, $(NH_4)_2SO_4$, $Li_2SO_4$, $CoSO_4$, or a combination thereof. Examples of the P precursor may include phosphorous powder, $(NH_4)_2HPO_4$, $NH_4H_2PO_4$, $Li_3PO_4$, $P_2O_5$, or a combination thereof.

In an embodiment, at least one inert gas selected from the group consisting of nitrogen, helium, and argon may be further added to, the carbon source gas.

The oxygen-containing gas may include carbon monoxide, carbon dioxide, water vapor, or a combination thereof.

When the oxygen-containing gas is used as the carbon source gas, the silicon suboxide may be formed to have an increased thickness as compared with a thickness of a naturally-occurring silicon suboxide layer. For example, a thickness of the silicon suboxide may be about 10 nm or less, or about 5 nm or less, or about 1 nm or less, for example, from about 0.1 to about 10 nm, or from about 0.5 nm to about 7.5 nm, or from about 0.5 nm to about 5 nm. When the thickness of the silicon suboxide is within these ranges, a shape and a thickness of the graphene may be appropriately controlled. In particular, when the silicon suboxide has a thickness greater than that of a naturally-occurring silicon suboxide layer, the graphene layer on the silicon suboxide may have a denser structure than a graphene nanosheet. The graphene layer may include, for example, 5 to 10 graphene layers.

When the gas mixture includes water vapor, the conductivity of the composite may further be improved. While not being limited by theory, it is understood that since carbon having a high degree of crystallinity may be deposited, in the presence of water vapor, on the silicon coated with the silicon suboxide by reaction with the gas mixture, the carbon composite may have high conductivity even when coated with a small amount of carbon. The amount of water vapor in the gas mixture, though not specifically limited, may be, for example, in a range of about 0.01% by volume to about 10% by volume, or about 0.05% to about 7.5% by volume, or about 0.1 to about 5% by volume based on 100% by volume of the carbon source gas.

In an embodiment, the carbon source gas may include methane, a mixed gas of methane and an inert gas, an oxygen-containing gas, or a mixed gas of methane and an oxygen-containing gas.

In another embodiment, the carbon source gas may be a mixed gas of $CH_4$ and $CO_2$, or a mixed gas of $CH_4$, $CO_2$, and $H_2O$. In another embodiment, the morphology of the graphene may be varied depending on a type of the carbon source in the gas.

The mixed gas of $CH_4$ and $CO_2$ may be supplied at a molar ratio of about 1:0.20 to about 1:0.50, and in an embodiment, at a molar ratio of about 1:0.25 to about 1:0.45, and in another embodiment, at a molar ratio of about 1:0.30 to about 1:0.40.

The mixed gas of $CH_4$, $CO_2$, and $H_2O$ may be supplied at a molar ratio of about 1:0.20:1 to 0.50:0.01 to 1.45, and in an embodiment, at a molar ratio of about 1:0.25:1 to 0.45:0.10 to 1.35, and in another embodiment, at a molar ratio of about 1:0.30:1 to 0.40:0.50 to 1.0.

In an embodiment, the carbon source gas may be carbon monoxide (CO) or carbon dioxide ($CO_2$).

In another embodiment, the carbon source gas may be a mixed gas of $CH_4$ and $N_2$.

The mixed gas of $CH_4$ and $N_2$ may be supplied at a molar ratio of about 1:0.20 to about 1:0.50, and in an embodiment, at a molar ratio of about 1:0.25 to 1:0.45, and in another embodiment, at a molar ratio of about 1:0.30 to about 1:0.40. In another embodiment, the carbon source gas may not include an inert gas such as nitrogen.

The thermal treatment may be performed at a temperature of about 750° C. to about 1,100° C., and in some embodiments, about 800° C. to about 1,000° C.

The thermal treatment may be performed at any pressure level without limitation. The pressure level for the thermal treatment may be appropriately selected in consideration of a thermal treatment temperature, composition of the gas mixture, and target amount of coated carbon. The pressure level for the thermal treatment may be controlled by varying the amounts of inflow and outflow of the gas mixture. For example, the pressure for the thermal treatment may be about 1 atmosphere (atm) or greater, and in some embodiments, about 2 atm or greater, about 3 atm or greater, about 4 atm or greater, or about 5 atm or greater. However, embodiments are not limited thereto.

The thermal treatment time may not be specifically limited, and may be appropriately controlled depending on the thermal treatment temperature, thermal treatment pressure, composition of the gas mixture, and target amount of coated carbon. For example, the thermal treatment time may be in a range of about 10 minutes to about 100 hours, and in an embodiment, may be in a range of about 30 minutes to about 90 hours, and in another embodiment, may be in a range of about 50 minutes to about 40 hours. However, embodiments are not limited thereto. While not limited to this theory, it is understood that the longer the thermal treatment time, the greater the amount of graphene (carbon) that may be deposited, and the better the electrical characteristics of the composite may become. However, these effects may not be directly proportional to the thermal treatment time. For example, deposition of graphene may stop or the deposition rate may become low after a predetermined duration.

According to an embodiment, a method of preparing a silicon-containing composite according to any one of the embodiments may provide a uniform coating of graphene on the silicon covered with the silicon suboxide ($SiO_x$), even at a relatively low temperature, through a vapor phase reaction of the carbon source gas as described above. Separation of the graphene from the silicon covered with the silicon suboxide ($SiO_x$) may substantially not occur. When the thickness of the silicon suboxide is appropriately controlled, the separation of the graphene may be even further suppressed. In this regard, a thickness of the silicon suboxide that may efficiently suppress separation of the graphene is about 10 nm or less, or about 7.5 nm or less, or about 5 nm or less, or about 2 nm or less, for example, from about 0.1 nm to about 10 nm, or about 0.1 nm to about 7.5 nm, or for example, from about 0.1 nm to about 5 nm.

Since the graphene is coated on the silicon suboxide through a vapor phase reaction to form a coating layer, the coating layer may have a high degree of crystallinity. When the porous silicon-containing composite is used as a negative active material, the negative active material may have improved conductivity without a structural change.

In an embodiment, the vapor deposition reaction for preparing a silicon-containing composite according to one or more embodiments may be performed in an atmosphere of a gas mixture including a carbon mixed gas and a reducing gas, such as hydrogen.

In an embodiment, when the silicon composite primary particles in a silicon-containing composite according to one or more embodiments include a silicon suboxide of the Formula $SiO_x$, wherein $0<x<2$ a thermal treatment product of a silicon suboxide of the Formula SiOx, wherein $0<x<2$, or a combination thereof; and a first graphene disposed on the silicon suboxide, the thermal treatment product of the silicon suboxide, or the combination thereof, the first graphene may be obtained by thermal treatment, for example, in an atmosphere including a gas mixture including a carbon source gas, such as methane, and hydrogen. For example, a mixed ratio of the carbon source gas to hydrogen may be about 1:1 to about 1:7, an in an embodiment, about 1:1 to about 1:5, or about 1:1 to about 1:3, by mole or by flow rate.

A process of preparing a carbon composite using a silicon-containing composite according to any of the embodiments may be as follows.

A silicon-containing composite according to an embodiment and a carbonaceous material may be mixed together and thermally treated.

The thermal treatment may be performed at a temperature of about 600° C. to about 1,100° C., for example about 700° C. to about 1,000° C. When the thermal treatment temperature is within these ranges, a carbon composite with improved capacity characteristics may be attained.

In the silicon-containing composite according to one or more embodiments, a carbon (C) to silicon (Si) atomic ratio (hereinafter, referred to as C/Si atomic ratio) obtained by X-ray photoelectron spectrometry (XPS) analysis may be from about 100:1 to about 200:1, for example, about 140:1 to about 180:1. In an embodiment, the C/Si atomic ratio in the silicon-containing composite obtained by XPS analysis may be increased as compared with that in a silicon-containing composite not including the at least one element selected from N, P, and S. Here, such an increase may be increased by, for example, 300% or more, and for example, 490% or more. The increase in the C/Si atomic ratio may refer to an increase in a covering ratio of the graphene on the surface of the silicon/silicon oxide.

In an embodiment, a silicon-containing composite or a carbon composite according to any of the above-described embodiments may be used in, for example, a battery, a light emission material for a display, a field emission material for a display, a thermoelectric device, or a biosensor.

According to another aspect, an electrode includes a silicon-containing composite or a carbon composite according to any of the above-described embodiments. The electrode may be an electrode for a lithium battery.

The electrode may be a negative electrode.

The silicon-containing composite or the carbon composite may be used as an electrode active material, for example, a negative active material. In this regard, when the silicon-containing composite or the carbon composite is used as a negative active material, volume expansion and disintegration of silicon may be reduced or prevented. The negative active material may have improved conductivity, and may improve high-rate characteristics of, for example, a lithium ion battery. Moreover, since a small amount of graphene may be coated on the silicon covered with the silicon suboxide, the negative active material may have improved energy density per volume. A lithium ion battery may be provided which may include the silicon-containing composite or the carbon composite, the carbon composite including a silicon-containing composite according to any of the embodiments and a carbonaceous material.

In an embodiment, the negative electrode may be manufactured in the following manner.

The negative electrode may be formed by molding, into a predetermined shape, a negative active material composition which may include, for example, a silicon-containing composite or a carbon composite according to an embodiment as a negative active material, a conducting agent, and a binder. Alternatively, the negative electrode may be formed by coating the negative active material composition on a current collector, such as a copper (Cu) foil. Also, the negative active material composition may not include a conducting agent.

In an embodiment, the negative active material composition may be formed as a film on a separator without the current collector.

In particular, the negative active material composition may be prepared by mixing the negative active material, a conducting agent, a binder, and a solvent. The negative active material composition may be directly coated on a metal current collector to form a negative electrode plate. In some embodiments, the negative active material composition may be cast onto a separate support to form a negative active material film. The negative active material film may be separated from the support and then laminated on a metal current collector to thereby form a negative electrode. The negative electrode is not limited to having the above-listed forms, and may have any of a variety of forms.

The negative active material composition may further include a carbonaceous negative active material, in addition to the above-described negative active material. For example, the carbonaceous negative active material may include natural graphite, artificial graphite, expansion graphite, graphene, carbon black, fullerene soot, carbon nanotubes, carbon fibers, or a combination thereof. However, embodiments are not limited thereto. Any suitable carbonaceous negative active material may be used.

The conducting agent may be acetylene black, ketjen black, natural graphite, artificial graphite, carbon black, carbon fibers, a metal powder or metal fibers of copper, nickel, aluminum, or silver, or a combination thereof. The conducting agent may include one or more conductive materials, such as a polyphenylene derivative, in combination. However, embodiments are not limited thereto. Any suitable conducting agent may be used.

The binder may be a vinylidene fluoride/hexafluoropropylene copolymer, polyvinylidenefluoride (PVDF), polyacrylonitrile, polymethylmethacrylate, polytetrafluoroethylene, a styrene-butadiene rubber-based polymer, polyacrylic acid, polyamide imide, polyimide, or a combination thereof. However, embodiments are not limited thereto. Any suitable binder may be used.

The solvent may be N-methylpyrrolidone, acetone, water, or a combination thereof. However, embodiments are not limited thereto. Any suitable solvent available in the art may be used.

Amounts of the negative active material, the conducting agent, the binder, and the solvent may be may be determined by those of skill in the art without undue experimentation. At least one of the conducting agent, the binder, and the solvent may be omitted depending on the use and structure of a lithium battery.

In an embodiment, a lithium battery may include the negative electrode. The lithium battery may be manufactured in the following manner.

First, a negative electrode may be manufactured according to the above-described method of manufacturing a negative electrode.

Next, a positive active material composition may be prepared by mixing a positive active material, a conducting agent, a binder, and a solvent. The positive active material composition may be directly coated on a metal current collector and dried to manufacture a positive electrode. In some other embodiments, the positive active material composition may be cast on a separate support to form a positive active material layer. The positive active material layer may then be separated from the support and then laminated on a metal current collector, to thereby manufacture a positive electrode.

The positive active material may include lithium cobalt oxide, lithium nickel cobalt manganese oxide, lithium nickel cobalt aluminum oxide, lithium iron phosphorous oxide, lithium manganese oxide, or a combination thereof. However, embodiments are not limited thereto. Any suitable positive active material may be used.

For example, the positive active material may be a lithium-containing metal oxide. Any suitable positive active material may be used. For example, the positive active material may include a composite lithium oxide including cobalt (Co), manganese (Mn), nickel (Ni), or a combination thereof. For example, the positive active material may be a compound represented by the following formulae: $Li_aA_{1-b}B_bD_2$ (wherein $0.90 \leq a \leq 1$ and $0 \leq b \leq 0.5$); $Li_aE_{1-b}B_bO_{2-c}D_c$ (wherein $0.90 \leq a \leq 1$, $0 \leq b \leq 0.5$, and $0 \leq c \leq 0.05$); $LiE_{2-b}B_bO_{4-c}D_c$ (wherein $0 \leq b \leq 0.5$ and $0 \leq c \leq 0.05$) $Li_aNi_{1-b-c}Co_bB_cD_\alpha$ (wherein $0.90 \leq a \leq 1$, $0 \leq b \leq 0.5$, $0 \leq c \leq 0.05$, and $0 < \alpha \leq 2$) $Li_aNi_{1-b-c}Co_bB_cO_{2-\alpha}F_\alpha$ (wherein $0.90 \leq a \leq 1$, $0 \leq b \leq 0.5$, $0 \leq c \leq 0.05$, and $0 < \alpha < 2$) $Li_aNi_{1-b-c}Co_bB_cO_{2-\alpha}F_2$ (wherein $0.90 \leq a \leq 1$, $0 \leq b \leq 0.5$, $0 \leq c \leq 0.05$, and $0 < \alpha \leq 2$) $Li_aNi_{1-b-c}Mn_bB_cD_\alpha$ (wherein $0.90 \leq a \leq 1$, $0 \leq b \leq 0.5$, $0 \leq c \leq 0.05$, and $0 < \alpha \leq 2$) $Li_aNi_{1-b-c}Mn_bB_cO_{2-\alpha}F_\alpha$ (wherein $0.90 \leq a \leq 1$, $0 \leq b \leq 0.5$, $0 \leq c \leq 0.05$, and $0 < \alpha < 2$) $Li_aNi_{1-b-c}Mn_bB_cO_{2-\alpha}F_2$ (wherein $0.90 \leq a \leq 1$, $0 \leq b \leq 0.5$, $0 \leq c \leq 0.05$, and $0 < \alpha < 2$) $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$ and $0.001 \leq b \leq 0.1$); $Li_aCoG_bO_2$ (wherein $0.90 \leq a \leq 1$ and $0.001 \leq b \leq 0.1$); $Li_aMnG_bO_2$ (wherein $0.90 \leq a \leq 1$ and $0.001 \leq b \leq 0.1$); $Li_aMn_2G_bO_4$ (wherein $0.90 \leq a \leq 1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A may be nickel (Ni), cobalt (Co), manganese (Mn), or a combination including at least one of the foregoing; B may be aluminum (Al), nickel (Ni), cobalt (Co), manganese (Mn), chromium (Cr), iron (Fe), magnesium (Mg), strontium (Sr), vanadium (V), a rare earth element, or a combination including at least one of the foregoing; D may be oxygen (O), fluorine (F), sulfur (S), phosphorus (P), or a combination including at least one of the foregoing; E may be cobalt (Co), manganese (Mn), or a combination including at least one of the foregoing; F may be fluorine (F), sulfur (S), phosphorus (P), or a combination including at least one of the foregoing; G may be aluminum (Al), chromium (Cr), manganese (Mn), iron (Fe), magnesium (Mg), lanthanum (La), cerium (Ce), strontium (Sr), vanadium (V), or a combination including at least one of the foregoing; Q may be titanium (Ti), molybdenum (Mo), manganese (Mn), or a combination including at least one of the foregoing; may be chromium (Cr), vanadium (V), iron (Fe), scandium (Sc), yttrium (Y), or a combination including at least one of the foregoing; and J may be vanadium (V), chromium (Cr), manganese (Mn), cobalt (Co), nickel (Ni), copper (Cu), or a combination including at least one of the foregoing.

The compounds listed above as positive active materials may have a surface coating layer (hereinafter, "coating layer"). Alternatively, a mixture of a compound without a coating layer and a compound having a coating layer, the compounds being the compounds listed above, may be used. The coating layer may include an oxide, hydroxide, oxyhydroxide, oxycarbonate, hydroxycarbonate, or a combination including at least one of the foregoing. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination including at least one of the foregoing. The coating layer may be formed by any suitable method that does not substantially adversely affect the physical properties of the positive active material when a compound of the coating element is used, for example, by a spray coating method, a dipping method, or the like. These methods are is known in the art, and thus a detailed description thereof will be omitted.

For example, the positive active material may be $LiNiO_2$, $LiCoO_2$, $LiMn_xO_{2x}$ (wherein x may be 1 or 2), $LiNi_{1-x}Mn_xO_2$ (wherein $0 < x < 1$), $LiNi_{1-x-y}Co_xMn_yO_2$ (wherein $0 \le x \le 0.5$ and $0 \le y \le 0.5$)), $LiFeO_2$, $V_2O_5$, TiS, MoS, or a combination including at least one of the foregoing.

The conducting agent, the binder, and the solvent used in the positive active material composition may be the same as those used in the negative active material composition described above. In an embodiment, a plasticizer may further be included in the positive active material composition and/or the negative active material composition to obtain an electrode plate including pores.

Amounts of the positive active material, the conducting agent, the binder, and the solvent may be the same as those suitably used in lithium batteries. At least one of the conducting agent, the binder, and the solvent may be omitted depending on the use and structure of a lithium battery.

Next, a separator to be disposed between the positive electrode and the negative electrode may be prepared. The separator may be any suitable separator material used in lithium batteries. In an embodiment, the separator material may have a low resistance to migration of ions in an electrolyte and have a good electrolyte-retaining ability. For example, the separator material may be glass fiber, polyester, Teflon, polyethylene, polypropylene, polytetrafluoroethylene (PTFE), or a combination including at least one of the foregoing, each of which may be a non-woven or woven fabric. For example, a rollable separator including polyethylene or polypropylene may be used in a lithium ion battery. A separator or separator material with a suitable organic electrolytic solution-retaining ability may be used in a lithium ion polymer battery. For example, the separator may be manufactured in the following manner.

In an embodiment, a polymer resin, a filler, and a solvent may be combined, for example by mixing, to prepare a separator composition. Then, the separator composition may be directly coated on a support and then dried to thereby form the separator. In another embodiment, the separator composition may be cast on a support and dried to form a separator film. The separator film may be separated from the support and laminated on an electrode to thereby form the separator.

The polymer resin used to manufacture the separator may be any suitable material used as a binder for electrode plates. For example, the polymer resin may be a vinylidene fluoride/hexafluoropropylene copolymer, PVDF, polyacrylonitrile, poly(methyl(meth)acrylate), or a combination including at least one of the foregoing.

The separator may include a ceramic composition to improve the separator functioning as a membrane. For example, the separator may be coated with an oxide or may be formed to include ceramic particles.

Next, an electrolyte may be prepared.

For example, the electrolyte may be an organic electrolyte. The electrolyte may be solid. For example, the electrolyte may be a boron oxide, a lithium oxynitride, or a combination including at least one of the foregoing. However, embodiments are not limited thereto. Any suitable solid electrolyte may be used. The solid electrolyte may be formed on the negative electrode by a suitable method, for example, by sputtering.

For example, an organic electrolyte may be prepared. The organic electrolyte may be prepared by dissolving a lithium salt in an organic solvent.

The organic solvent may be any suitable organic solvent. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, dioxolane, 4-methyldioxolane, N,N-dimethyl formamide, N,N-dimethyl acetamide, N,N-dimethylsulfoxide, dioxane, 1,2-dimethoxyethane, sulfolane, dichloroethane, chlorobenzene, nitrobenzene, diethylene glycol, dimethyl ether, or a combination including at least one of the foregoing.

The lithium salt may be any suitable lithium salt. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may be natural numbers), LiCl, LiI, or a combination including at least one of the foregoing.

Figure 12A:
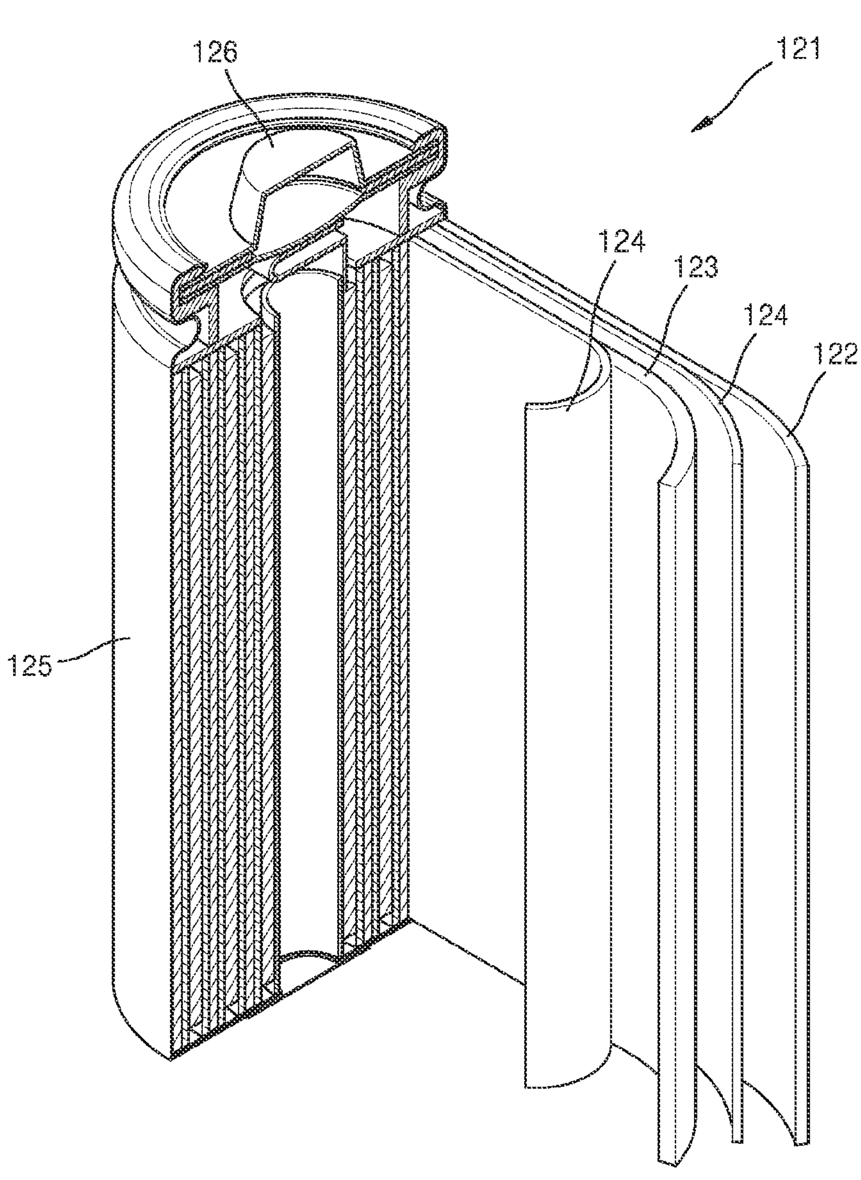
FIG. 12A is a diagram illustrating an embodiment of a lithium battery.

Referring to FIG. 12A, a lithium battery 121 according to an embodiment may include a positive electrode 123, a negative electrode 122, and a separator 124. The positive electrode 123, the negative electrode 122, and the separator 124 may be wound or folded, and then sealed in a battery case 125. Then, the battery case 125 may be filled with an organic liquid electrolyte and sealed with a cap assembly 126, thereby completing the manufacture of the lithium battery 121. The battery case 125 may be a cylindrical type, a rectangular type, or a thin-film type. For example, the lithium battery 121 may be a thin-film type battery. For example, the lithium battery 121 may be a lithium ion battery.

The separator 124 may be interposed between the positive electrode 123 and the negative electrode 122 to form a battery assembly. A plurality of such battery assemblies may be stacked in a bi-cell structure and impregnated with an organic electrolyte solution. The resultant battery assembly may then be put into a pouch and hermetically sealed to thereby complete the manufacture of a lithium ion battery.

In an embodiment, a plurality of battery assemblies may be stacked upon one another to form a battery pack, which may be used in any device that benefits from high capacity and high output, for example, in a laptop computer, a smartphone, an electric vehicle, or the like.

The lithium battery including such a battery pack may have improved high-rate characteristics and lifetime characteristics, and thus may be applicable in an electric vehicle (EV), for example, in a hybrid vehicle such as plug-in hybrid electric vehicle (PHEV).

According to another aspect, a field emission device includes a silicon-containing composite or a carbon composite according to any one of the embodiments.

The field emission device is a device which is based upon the migration of electrons. The field emission device may include, at least, a reduction electrode, an emitter tip, and an oxidation electrode separated from the reduction electrode. Examples of such a field emission device are disclosed in U.S. Pat. Nos. 7,009,331; 6,976,897; 6,911,767; and US 2006/0066217, the disclosures of which are incorporated in their entirety by reference. The emitter tip may emit electrons as a voltage is applied between the reduction electrode and the oxidation electrode. The electrons may migrate from the reduction electrode toward the oxidation electrode. A field emission device according to an embodiment of the present disclosure may be used for various purposes, for example, in ultrasonic vacuum tube equipment (for example, an X-ray tube), a power amplifier, an ion gun, a high-energy accelerator, a free-electron laser, or an electron microscope, and in an embodiment, in a flat display device. A flat display device may be used as an alternative to a cathode tube, and may also be applicable in a TV or a computer monitor.

The silicon-containing composite or a carbon composite according to any one of the embodiments may be used as the emitter tip.

The emitter tip may be manufactured using a metal such as molybdenum (Mo) or a semiconductor such as silicon. One of the concerns with using the metal emitter is a comparatively high control voltage of about 100 volts (V) for emission. In addition, due to non-uniformity of such emitter tips, current densities of individual pixels of a field emission device using the emitter tips may be non-uniform.

When a silicon-containing composite or a carbon composite according to any one of the embodiments is used as the emitter tip, the field emission device may have improved field emission characteristics.

The silicon-containing composite or carbon composite according to any one of the embodiments may be used to manufacture an electroluminescent device.

According to another aspect, a biosensor includes a silicon-containing composite or a carbon composite according to any one of the above-described embodiments.

The silicon-containing composite or the carbon composite according to any one of the embodiments may be used to form an electrode for a biosensor.

Figure 12B:
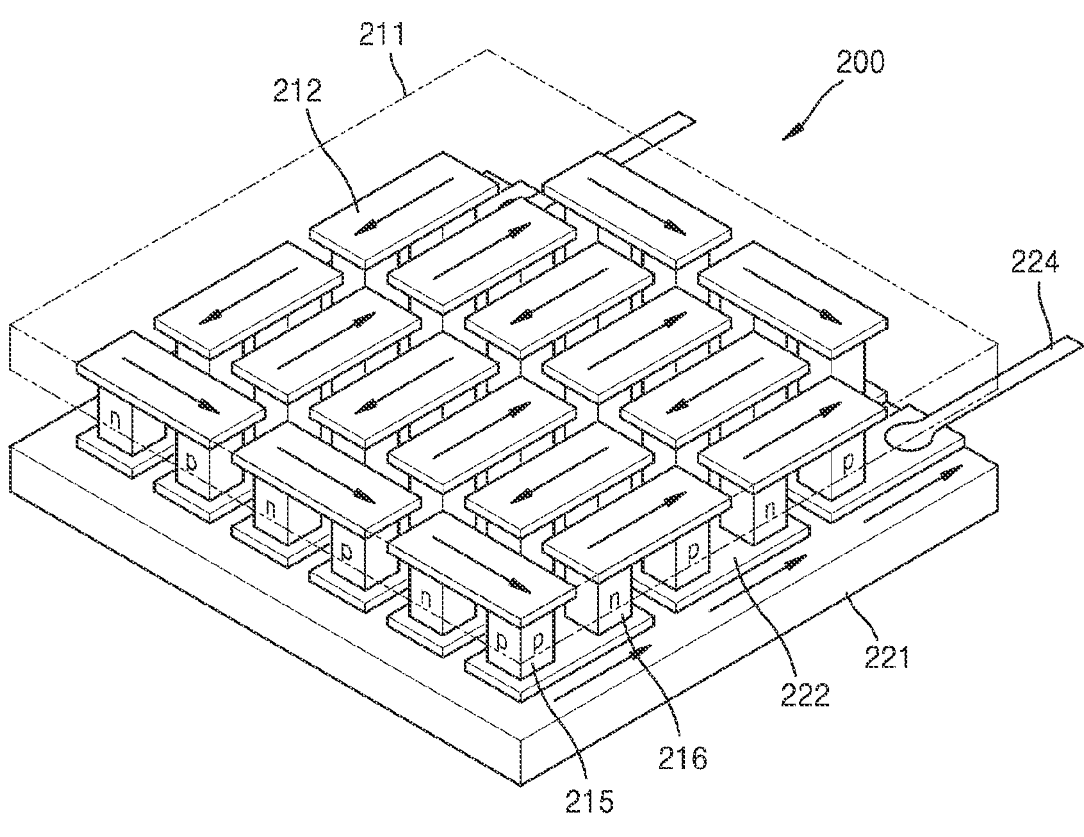
FIG. 12B is a perspective view of an embodiment of a thermoelectric module.
Figure 12C:
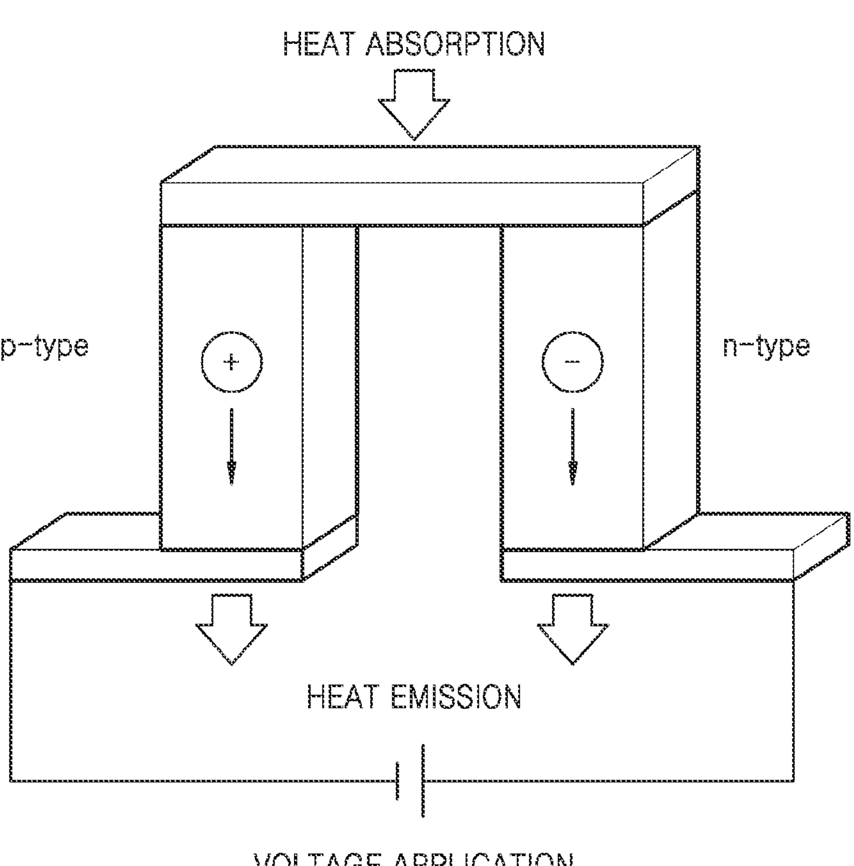
FIG. 12C is a schematic view illustrating an embodiment of a thermoelectric cooler having a design using the Peltier effect.
Figure 12D:
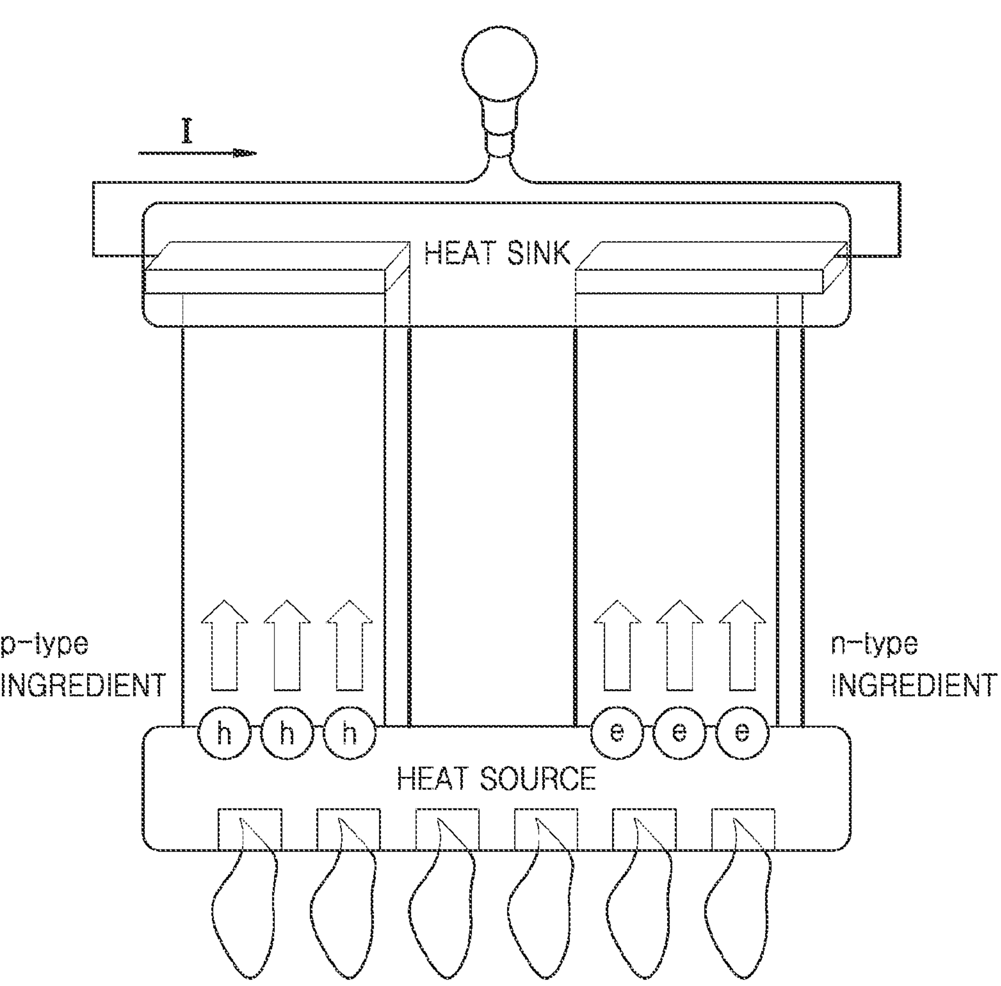
FIG. 12D is a schematic view illustrating an embodiment of a thermoelectric generator having a design using the Seebeck effect.
Figure 12E:
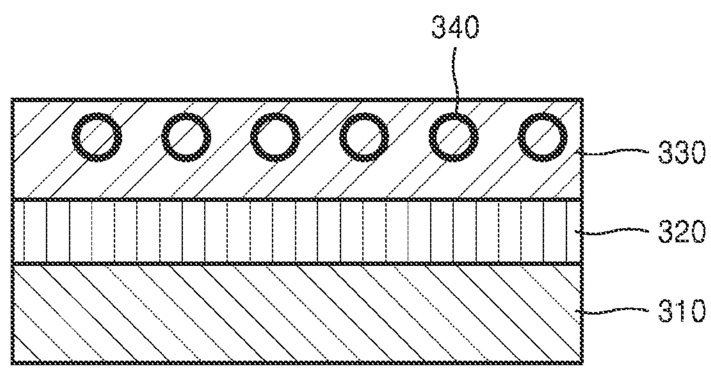
FIG. 12E is a cross-sectional view illustrating a structure of an embodiment of an electrode of a biosensor.

FIG. 12E is a cross-sectional view illustrating a structure of an electrode of a biosensor according to an embodiment of the present disclosure.

Referring to FIG. 12E, the electrode of a biosensor may include a substrate 310, a first layer 320 on the substrate 310, the first layer 320 including a porous silicon-containing composite or carbon composite according to any one of the embodiments, and a second layer 330 on the first layer 320. A biomaterial 340 may be supported by or fixed in the second layer 330 in a variety of manners.

The substrate 310 may be any suitable plate on which graphene may be deposited or formed, and for example, may be glass, plastic, metal, ceramic, silicon, or a combination including at least one of the foregoing. The type of the substrate 310 is not specifically limited, provided that graphene may be deposited or formed thereon.

The biomaterial 340 may be enzymes, aptamers, proteins, nucleic acids, microorganisms, cells, lipids, hormones, DNA, PNA, RNA, or a combination including at least one of the foregoing. Any of various suitable biomaterials, not already stated herein, may also be used.

Referring to FIG. 12E, in the electrode of a biosensor, the biomaterial 340 may be an enzyme, and the second layer 330 may be a layer able to support or fix the enzyme therein. Although according to FIG. 12E an enzyme as the biomaterial 340 appears as being supported or fixed in the second layer 330, the location of the enzyme is not limited thereto, and the enzyme may partially or entirely protrude through the surface of the second layer 330 and be exposed (not shown). When a biosensor has this structure including an enzyme with substrate specificity to selectively respond to a target molecule in a mixture, the biosensor may selectively sense an analyte (for example, blood sugar) to which the enzyme responds.

According to another aspect, a semiconductor device includes a silicon-containing composite or a carbon composite according to any one of the above-described embodiments.

The silicon-containing composite or the carbon composite may be used as an electrode of the semiconductor device.

According to another aspect, there are provided a thermoelectric material and a thermoelectric device, each including a silicon-containing composite or a carbon composite according to any one of the above-described embodiments.

The thermoelectric material may have good electrical characteristics, and consequently may have improved thermoelectric performance. The thermoelectric material may be used in a thermoelectric device, a thermoelectric module, or a thermoelectric system.

The performance of the thermoelectric material is evaluated using a dimensionless figure of merit (ZT), which is defined by Equation 1:

$$ZT=(S^2\sigma T)/k \quad \text{[Equation 1]}$$

wherein, in Equation 1, ZT is a figure of merit, S is a Seebeck coefficient, a is an electrical conductivity, T is an absolute temperature, and κ is a thermal conductivity.

As represented in Equation 1, an increase in the ZT value of a thermoelectric material may be obtained by increasing the Seebeck coefficient (S) and the electrical conductivity (σ) of the thermoelectric material, i.e., a power factor ($S^2\sigma$), and reducing the thermal conductivity (k) of the thermoelectric material.

The silicon-containing composite or carbon composite according to any one of the above-described embodiments includes graphene, and thus may provide high electrical conductivity and low thermal conductivity to a thermoelectric material when included therein, according to the characteristics of the graphene, and thus improve the performance of the thermoelectric material.

In a silicon-containing composite or carbon composite according to any one of the above-described embodiments, crystalline characteristics and an electron structure may be changed at an interface between the metallic graphene and semi-conductive silicon to increase a Seebeck coefficient thereof and accelerate transfer of charge particles, which may consequently induce an increase in electrical conductivity and charge mobility. In addition, phonon scattering at the interface between the graphene and silicon may be increased so that it may be possible to control the thermal conductivity of the thermoelectric material.

The silicon-containing composite or the carbon composite according to any one of the above-described embodiments may be effectively used as a thermoelectric material. A thermoelectric device may be manufactured by processing the thermoelectric material into a shape, for example, by cutting. The thermoelectric device may be a p-type thermoelectric device. The thermoelectric device may be a structure formed by shaping the thermoelectric material in a predetermined shape, for example, in a rectangular parallelepiped shape.

The thermoelectric device may have a cooling effect when combined with an electrode and a current is applied thereto, and may have a power generation effect based on a temperature difference.

FIG. 12B is a schematic view of a thermoelectric module 200 using a thermoelectric device according to an embodiment of the present disclosure. Referring to FIG. 12B, an upper electrode (first electrode) 212 and a lower electrode (second electrode) 222 are patterned on an upper insulating substrate 211 and a lower insulating substrate 221, respectively. The upper electrode 212 and the lower electrode 222 may contact a p-type thermoelectric component 215 and an n-type thermoelectric component 216. The upper electrode 212 and the lower electrode 222 may be connected to the outside of the thermoelectric device by a lead electrode 224. The p-type thermoelectric component 215 may be a thermoelectric device according to any one of the above-described embodiments. The n-type thermoelectric component 216 may not be specifically limited, and may be any suitable material known in the art.

The upper and lower insulating substrates 211 and 221 may include gallium arsenide (GaAs), sapphire, silicon, Pyrex, quartz, or a combination including at least one of the foregoing. The upper and lower electrodes 212 and 222 may include, for example, copper, aluminum, nickel, gold, titanium, or a combination including at least one of the foregoing, and may have various sizes. The upper and lower electrodes 212 and 222 may be formed using any suitable patterning method, for example, a lift-off semiconductor process, a deposition method, a photolithography technique, or a combination including at least one of the foregoing.

In an embodiment, one of the first and second electrodes 212 and 222 in the thermoelectric module may be exposed to a heat source as illustrated in FIGS. 12C and 2D. In some other embodiments, one of the first and second electrodes 212 and 222 in the thermoelectric module may be electrically connected to a power supply source, or to the outside of the thermoelectric module, for example, an electric device (for example, a battery) that consumes or stores electric power.

In an embodiment, one of the first and second electrodes 212 and 222 in the thermoelectric module may be electrically connected to a power supply source.

One or more embodiments of the present invention will now be described in detail with reference to the following examples. However, these examples are only for illustrative purposes and are not intended to limit the scope of the one or more embodiments of the present invention.

EXAMPLES

Preparation Example 1

Needle-like silicon was pulverized to obtain plate-like and needle-like silicon particles having a silicon suboxide ($SiO_x$, wherein $0<x<2$) film (having a thickness of about 0.1 nm) on a surface thereof and having a particle length (D90) of about 150 nm and a thickness of about 40 nm.

A composition including 25 parts by weight of the plate-like and needle-like silicon particles, 10 parts by weight of stearic acid, and 65 parts by weight of isopropyl alcohol was spray-dried, and then dried to obtain porous silicon composite secondary particles having an average particle diameter in a range of about 3 μm to about 6 μm.

The spray-drying was performed using a spray drier (MMSD Micro Mist Spray Dryers, Fujisaki Electric). The spray nozzle size, pressure under a $N_2$ atmosphere, and powder spray temperature (about 200° C.) were controlled, and then the resultant was dried to prepare porous silicon composite secondary particles from which isopropyl alcohols were removed. The spray nozzle size was controlled to about 150 μm, and the spray nozzle was about 0.6 MPa.

The porous silicon composite secondary particles were loaded into a reactor. A $N_2$ gas was purged into the reactor, and as a reaction gas, a gas mixture was supplied into the reactor to create an atmosphere of the gas, the gas mixture containing a composition shown in Table 1. Here, the pressure level inside the reactor resulting from the supply of the gas was 1 atm. The internal temperature of the reactor was increased to 1,000° C. (at a rate of about 23° C./min) under the atmosphere of the gas. While the gas was continuously supplied into the reactor, thermal treatment was performed at 1,000° C. for about 1 hour. The resulting product was left for about 3 hours. Afterwards, the supply of the gas was stopped, and the reactor was cooled down to room temperature (25° C.), and nitrogen a $N_2$ gas was purged into the reactor again, thereby obtaining a silicon-containing composite. The silicon-containing composite is porous.

A total amount of a first graphene and a second graphene in the silicon-containing composite was about 25 parts by weight, based on 100 parts by weight of a total weight of the silicon-containing composite.

Preparation Example 2-6

Silicon-containing composite were obtained in the same manner as in Preparation Example 1, except that, as the reaction gas, a gas mixture including a composition of Table 1 was each used.

Preparation Example 7

A silicon-containing composite was obtained in the same manner as in Preparation Example 1, except that, as the plate-like and needle-like silicon particles, plate-like and needle-like silicon particles having a silicon suboxide ($SiO_x$, wherein $0<x<2$) film (having a thickness of about 0.1 nm) on a surface thereof and having a length (D90) of about 200 nm and a thickness of about 40 nm were used.

Preparation Example 8

A silicon-containing composite was obtained in the same manner as in Preparation Example 1, except that, as the plate-like and needle-like silicon particles, plate-like and needle-like silicon particles having a silicon suboxide ($SiO_x$, wherein $0<x<2$) film (having a thickness of about 0.1 nm) on a surface thereof and having a length (D90) of about 100 nm and a thickness of about 40 nm were used.

Reference Preparation Example 1

A silicon-containing composite was obtained in the same manner as in Preparation Example 1, except that as the plate-like and needle-like silicon particles, plate-like and needle-like silicon particles having a silicon suboxide ($SiO_x$, wherein $0<x<2$) film (having a thickness of about 0.1 nm) on a surface thereof and having a length (D90) of about 200 nm and a thickness of about 40 nm were used, and that, as the reaction gas, a gas mixture including a composition of Table 1 was used.

As shown in Table 1, the first graphene and the second graphene included in the each of the porous silicon-containing composites prepared according to Preparation Examples 1 to 8 were in the form of either a film or a flake. The first graphene and the second graphene were found to usually have a film form in a region adjacent to the silicon suboxide, and a flake form in a region away from the adjacent region. The first graphene and the second graphene included in the porous silicon-containing composite prepared according to Preparation Example 5 were more likely to be present in the form of a film, as compared with those included in the porous silicon-containing composites prepared according to Preparation Examples 1 to 4 and Preparation Example 6 to 8.

TABLE 1

| | Size of silicon particles (length of long axis of plate- and needle-like silicon particle) (nm) | Reaction gas (volume %) $CH_4$ | $CO_2$ | $NH_3$ | Form of first graphene and second graphene |
|---|---|---|---|---|---|
| Preparation Example 1 | 150 | 80 | 10 | 10 | Film+ flake |
| Preparation Example 2 | 150 | 95 | — | 5 | Film+ flake |
| Preparation Example 3 | 150 | 90 | — | 10 | Film+ flake |
| Preparation Example 4 | 150 | 80 | — | 20 | Film+ flake |
| Preparation Example 5 | 150 | 60 | 20 | 20 | Film+ flake |
| Preparation Example 6 | 150 | 90 | 5 | 5 | Film+ flake |
| Preparation Example 7 | 200 | 80 | 10 | 10 | Film+ flake |
| Preparation Example 8 | 100 | 80 | 10 | 10 | Film+ flake |
| Reference Preparation Example 1 | 200 | 100 | 0 | 0 | Film |

Comparative Preparation Example 1

A composition including 20 parts by weight of granule-like silicon having a size of 10 μm, 10 parts by weight of stearic acid, and 70 parts by weight of isopropyl alcohol was pulverized to prepare a slurry including needle-like silicon particles. The slurry was dried without a spraying process.

The resulting product was pulverized to obtain needle-like silicon particles having a length of 125 nm having a silicon suboxide ($SiO_x$, wherein $0<x<2$) film (having a thickness of about 0.1 nm).

The needle-like silicon particles were loaded into a reactor. A $N_2$ gas (300 sccm) was supplied into the reactor to create an atmosphere of the gas. Here, the pressure level inside the reactor resulting from the supply of the gas was 1 atm. The internal temperature of the reactor was increased to 950° C. (at a rate of about 23° C./min) under the atmosphere of the gas. While the gas was continuously supplied into the reactor, thermal treatment was performed at 950° C. for 3 hours. The resulting product was left for about 4 hours, thereby obtaining porous silicon composite primary particles. The porous silicon composite primary particles had a structure including needle-like silicon.

Comparative Preparation Example 2

A silicon-containing composite was prepared in the same manner as in Preparation Example 1, except that $CH_4$ was used as the reaction gas and pyridine was used as a N precursor.

When prepared according to Comparative Preparation Example 2, the adhesion of a silicon/silicon suboxide and a first graphene, and/or the adhesion of a porous silicon composite secondary particle and a second graphene in the resulting porous silicon composite was very poor.

Example 1: Manufacture of Negative Electrode and Coin Full Cell

The silicon-containing composite of Preparation Example 1, graphite, lithium polyacrylate (Li-PAA), and deionized water as a solvent were mixed to prepare a slurry. A ratio of a mixture of the porous silicon composite of Preparation Example 1 and graphite, and lithium polyacrylate in the slurry was about 92:8 by weight on a solid content basis. A ratio of the silicon-containing composite of Preparation Example 1 to graphite in the mixture was about 1:12 by weight.

The slurry was applied to a copper (Cu) foil using a doctor blade to form a film having a thickness of about 40 μm. The film was vacuum-dried at about 120° C. for about 2 hours and roll-pressed, thereby manufacturing a negative electrode.

A positive electrode was manufactured using a slurry obtained by mixing $LiNi_{0.6}Co_{0.2}Mn_{0.2}O_2$, Denka Black polyvinylidene fluoride (PVDF) as a binder, and NMP as a solvent. A mixed ratio by weight of $LiNi_{0.6}Co_{0.2}Mn_{0.2}O_2$, Denka Black, and PVDF as a binder, in the slurry was about 93:5:2.

A coin full cell was manufactured using the negative electrode and a positive electrode. The slurry was applied to an aluminum (Al) foil using a doctor blade to form a film having a thickness of about 40 μm. The film was vacuum-dried at about 120° C. for about 2 hours and roll-pressed, thereby manufacturing the positive electrode.

A polypropylene membrane (Cellgard 3510) was used as a separator, and an electrolyte was used which included 1.3M $LiPF_6$ in a mixture of ethylene carbonate (EC), diethyl carbonate (DEC), and fluoroethylene carbonate (FEC) at a volume ratio of about 50:25:25.

Example 1A: Manufacture of Negative Electrode and Coin Full Cell

A coin full cell was manufactured in the same manner as in Example 1, except that 1.3 M $LiPF_6$ EC:DEC:FEC (at a volume ratio of 68:25:7) was used as the electrolyte.

Examples 2 to 8: Manufacture of Negative Electrode and Coin Full Cell

Negative electrodes and coin full cells were prepared in the same manner as in Example 1, except that the silicon-containing composites of Preparation Examples 2 to 8 were used, respectively, instead of the porous silicon-containing composite of Preparation Example 1.

Example 7A

A coin full cell was manufactured in the same manner as in Example 7, except that 1.3 M $LiPF_6$ EC:DEC:FEC (at a volume ratio of 68:25:7) was used as the electrolyte.

Example 7B

A coin full cell was manufactured in the same manner as in Example 7, except that 1.3 M $LiPF_6$ EC:DEC (at a volume ratio of 75:25) was used as the electrolyte.

Example 8A

A coin full cell was manufactured in the same manner as in Example 8, except that 1.3 M $LiPF_6$ EC:DEC:FEC (at a volume ratio of 68:25:7) was used as the electrolyte.

Example 9: Manufacture of Negative Electrode and Coin Half Cell

The porous silicon-containing composite of Preparation Example 1, carbon black (KB600JD), AST9005

(AEKYUNG, Republic of Korea), and deionized water as a solvent were mixed to prepare a slurry. A ratio by weight of the mixture of the porous silicon-containing composite of Preparation Example 1, carbon black (KB600JD), and AST9005 (AEKYUNG, Republic of Korea) was about 79:1:20 on a solid basis.

The slurry was applied to a Cu foil using a doctor blade to form a film having a thickness of about 40 μm. The film was vacuum-dried at about 120° C. for about 2 hours and roll-pressed, thereby manufacturing a negative electrode.

A coin half cell was manufactured using the negative electrode and a lithium metal as a counter electrode.

A polypropylene membrane (Celgard 3510) was used as a separator, and an electrolyte was used which included 1.3M $LiPF_6$ in a mixture of EC, DEC, and FEC at a volume ratio of about 2:6:2.

Examples 10 to 16: Manufacture of Negative Electrode and Coin Half Cell

Negative electrodes and coin half cells were manufactured in the same manner as in Example 9, except that the silicon-containing composite of Preparation Examples 2 to 8 were used, respectively, instead of the silicon-containing composite of Preparation Example 1.

Example 17: Manufacture of Negative Electrode and Coin Full Cell

A negative electrode and a coin full cell were manufactured in the same manner as in Example 1, except that carbon black (KB600JD), was used instead of graphite.

Example 18: Manufacture of Negative Electrode and Coin Full Cell

A negative electrode and a coin full cell were manufactured in the same manner as in Example 1, except that the ratio by weight of the mixture of the silicon containing composite of Preparation Example 1 and graphite was changed from about 1:12 to about 1:99.

Example 19: Manufacture of Negative Electrode and Coin Full Cell

A negative electrode and a coin full cell were manufactured in the same manner as in Example 1, except that the ratio by weight of the mixture of the silicon-containing composite of Preparation Example 1 and graphite was changed from about 1:12 to about 3:97.

Example 20: Manufacture of Negative Electrode and Coin Full Cell

A negative electrode and a coin full cell were manufactured in the same manner as in Example 1, except that the ratio by weight of the mixture of the silicon-containing composite of Preparation Example 1 and graphite was changed from about 1:12 to about 1:1.

Comparative Example 1: Manufacture of Negative Electrode and Coin Full Cell

A negative electrode and a coin full cell were manufactured in the same manner as in Example 1, except that the silicon composite primary particles of Comparative Preparation Example 1 were used instead of the silicon-containing composite of Preparation Example 1.

Comparative Example 1A: Manufacture of Negative Electrode and Coin Half Cell

A negative electrode and a coin half cell were manufactured in the same manner as in Example 9, except that the silicon-containing composite primary particles of Comparative Preparation Example 1 were used instead of the silicon-containing composite of Preparation Example 1.

Comparative Example 2: Manufacture of Negative Electrode and Coin Full Cell

A negative electrode and a coin full cell were manufactured in the same manner as in Example 1, except that the silicon-containing composite of Comparative Preparation Example 2 were used instead of the silicon-containing composite of Preparation Example 1.

Comparative Example 2A: Manufacture of Negative Electrode and Coin Half Cell

A negative electrode and a coin half cell were manufactured in the same manner as in Example 9, except that the silicon-containing composite of Comparative Preparation Example 2 were used instead of the silicon-containing composite of Preparation Example 1.

Evaluation Example 1: Charge and Discharge Characteristics (1) Measurement of Initial Efficiency, Rate Capability, Coulombic Efficiency, and Discharge Capacity 1) Examples 1 to 8 and Comparative Example 1

Charge and discharge characteristics of the coin full cells of Examples 1 to 8 and Comparative Example 1 were evaluated according to the following methods:

(Charge: 1.0 C/Cutoff: 4.2 V-0.01 C, Discharge: 1.0 C/Cutoff: 2.8 V)

The results of evaluating the charge and discharge characteristics are shown in Table 2.

TABLE 2

| | Initial efficiency (%) | Lifespan (@ 100 times)(%) | Lifespan (@ 300 times)(%) |
|---|---|---|---|
| Example 1 | 87.0 | 95.1 | 77.3 |
| Example 2 | 89.1 | 90.5 | — |
| Example 3 | 87.8 | 91.2 | — |
| Example 4 | 88 | 90.8 | — |
| Example 5 | 86.3 | 93.1 | — |
| Example 6 | 88.1 | 91.4 | — |
| Example 7 | 87 | — | — |
| Example 8 | 86.7 | — | — |
| Comparative Example 1 | 67 | — | 45.1 |

2) Examples 7A, 7B, and 8A and Comparative Example 1

Charge and discharge characteristics of the coin cells of Examples 7A, 7B, 8A, and Comparative Example 1 were evaluated according to the following methods at a temperature of 45° C.

(Charge: 1.0 C/Cutoff: 4.2 V-0.01 C, Discharge: 1.0 C/Cutoff: 2.8 V)

The results of evaluating the charge and discharge characteristics are shown in Table 3.

TABLE 3

| | Lifespan (@ 300 times)(%) |
|---|---|
| Example 7A | 79.6 |
| Example 7B | 88.3 (@ 150 times) |
| Example 8A | 79.1 |
| Comparative Example 1 | 45.1 |

Evaluation Example 2: Raman Analysis

The silicon-containing composite of Preparation Example 1 was analyzed by Raman analysis using a Raman 2010 Spectra (NT-MDT Development Co.) (Laser system: 473, 633, 785 nm, Lowest Raman shift: ~50 $cm^{-1}$, and spatial resolution: about 500 nm).

Figure 4:
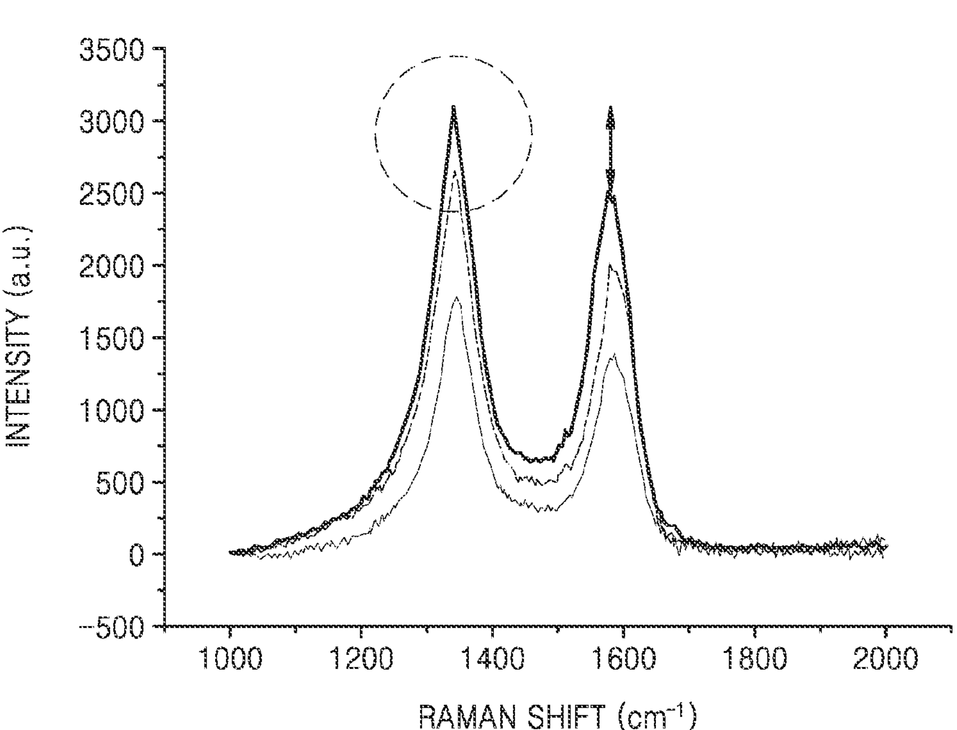
FIG. 4 is a graph of intensity (arbitrary units, a.u.) versus Raman shift (per centimeter, $cm^1$), which shows the results of Raman spectroscopic analysis with respect to the porous silicon composite prepared according to Preparation Example 1.

The results obtained by Raman analysis for the silicon-containing composite of Preparation Example 1 are shown in FIG. 4. The intensity ratios of peak D to peak G of the silicon-containing composite of Preparation Example 1 were analyzed based on the results of the Raman analysis, and the results thereof are shown in Table 4.

Raman spectra of graphene exhibit peaks at 1,350 cm-1, 1,580 $cm^{-1}$, and 2,700 $cm^{-1}$, providing information about a thickness, crystallinity, and a charge doping state. The peak at 1,580 $cm^{-1}$ is a peak referred to as "G-mode" which is generated from a vibration mode, i.e., stretching of carbon-carbon bonds, and an energy of the G-mode is determined by a density of excess charges doped by graphene. The peak at 2,700 $cm^{-1}$ is a peak referred to as "2D-mode," which is useful in evaluating a thickness of the graphene. The peak at 1,350 $cm^{-1}$ is a peak referred to as "D-mode," which appears when there is a defect in a $SP^2$ crystalline structure. A D/G intensity (Id/Ig) provides information about disordering of crystals of the graphene.

TABLE 4

| | Id/Ig |
|---|---|
| Preparation Example 1 | 1.20 |

Referring to Table 4, it was confirmed that the silicon-containing composite of Preparation Example 1 had improved crystallinity and quality of the graphene.

Evaluation Example 3: X-Ray Photoelectron Spectroscopy (XPS) Analysis (Oxygen and Carbon Amounts in Graphene)

1) The oxygen and carbon amounts of the silicon-containing composite of Preparation Examples 1 to 8 were analyzed by XPS, and the analysis results are shown in Table 5.

The XPS analysis was performed using a Quantum 2000 (Physical Electronics. Inc.) (acceleration voltage: 0.5 keV-15 keV, 300 W, energy resolution: about 1.0 eV, and sputter rate: 0.1 nm/min).

TABLE 5

| | Carbon (%) | Oxygen (%) |
|---|---|---|
| Preparation Example 1 | 22.0 | 6.9 |
| Preparation Example 2 | 23.0 | 5.5 |
| Preparation Example 3 | 22.0 | 6.5 |
| Preparation Example 4 | 20 | 7.3 |
| Preparation Example 5 | 22 | 7.4 |
| Preparation Example 6 | 23 | 6.3 |
| Preparation Example 7 | 22 | 6.9 |
| Preparation Example 8 | 29 | 7.12 |

In Table 5, a carbon amount was determined based on the carbon amount corresponding to C1s peaks, and an oxygen amount was determined based on the oxygen amount corresponding to O1s peaks.

Evaluation Example 4: Scanning Electron Microscopy (SEM)

Figure 9A:
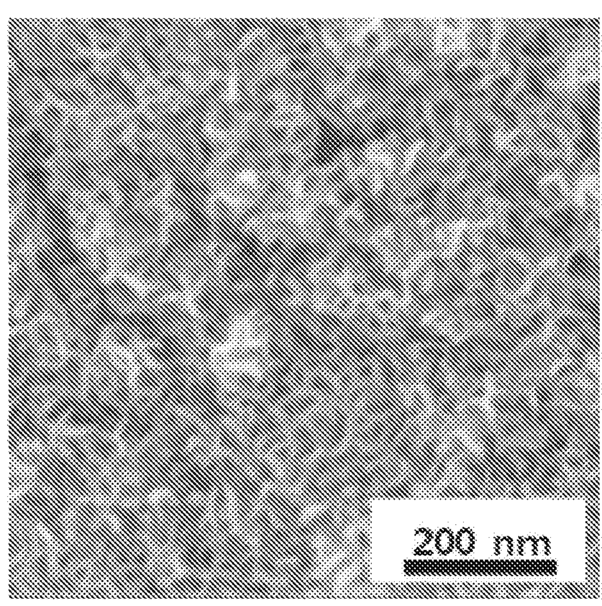
FIGS. 9A and 9B are scanning electron microscope (SEM) images of the silicon-containing composite prepared according to Preparation Example 1.
Figure 9B:
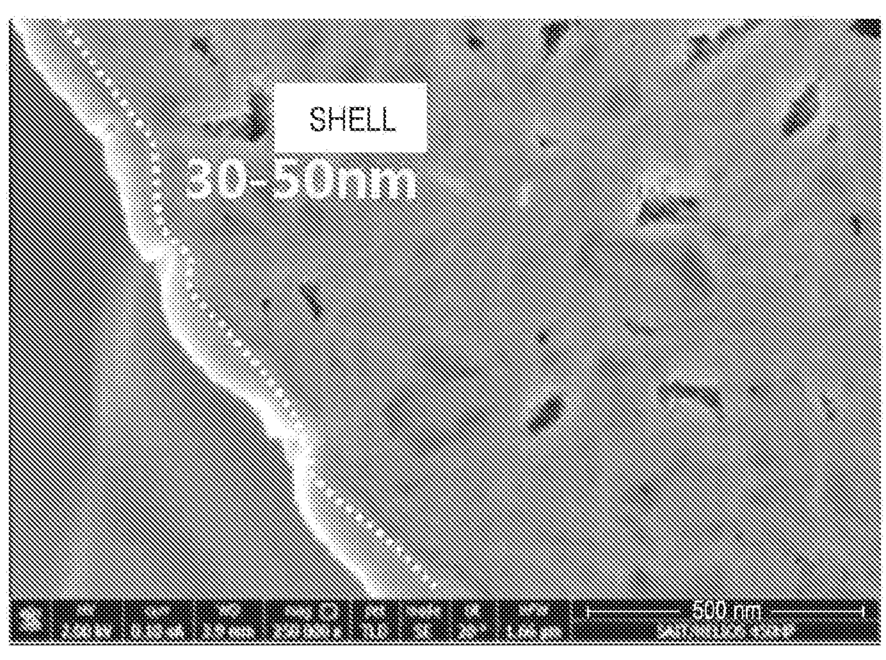
Figure 10A:
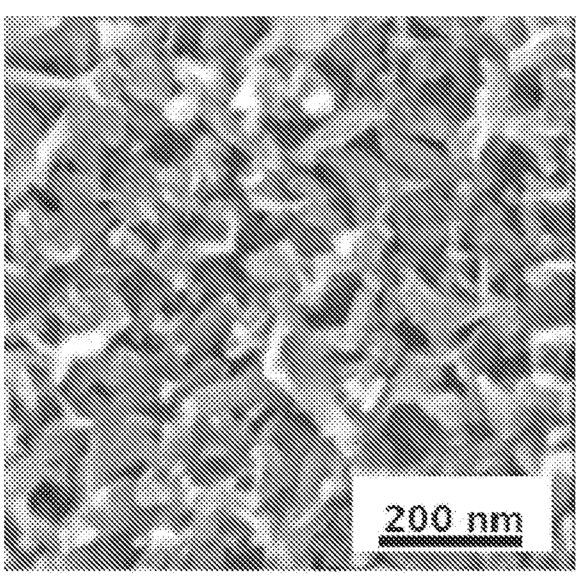
FIGS. 10A and 10B are SEM images of the silicon-containing composite prepared according to Reference Example 1.
Figure 10B:
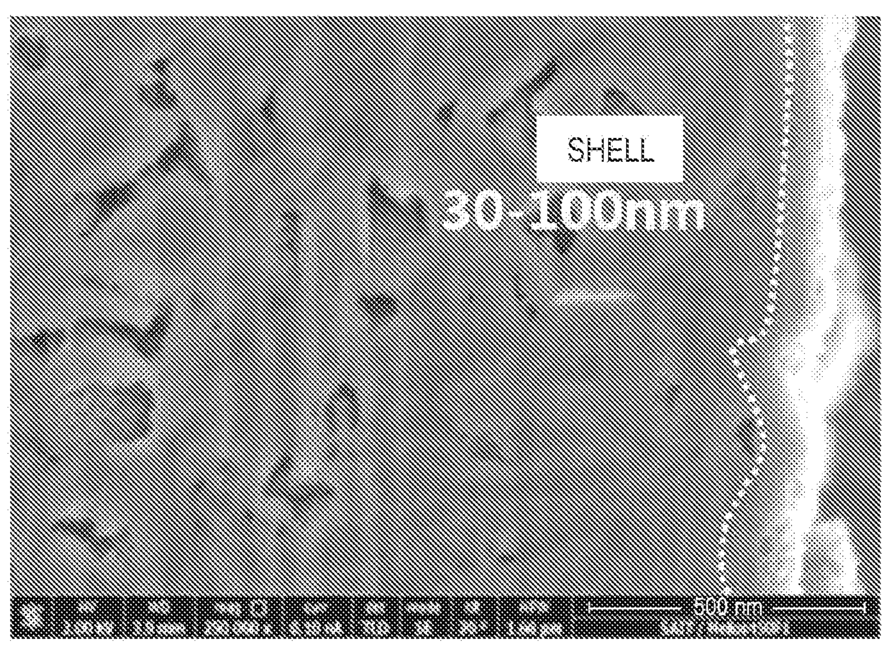

The silicon-containing composite of Preparation Example 1 was analyzed by SEM, and the results are shown in FIGS. 9A and 9B. The results obtained by SEM analysis for the silicon-containing composite of Reference Preparation Example 1 are shown in FIGS. 10A and 10B.

Referring to FIGS. 9A, 9B, 10A, and 10B, it was confirmed that the silicon-containing composite of Preparation Example 1 had excellent adhesion between the core and the shell and excellent coating uniformity of small-sized graphene, as compared with the silicon-containing composite of Reference Preparation Example 1.

Evaluation Example 5: Thermogravimetric Analysis (TGA)

Figure 5:
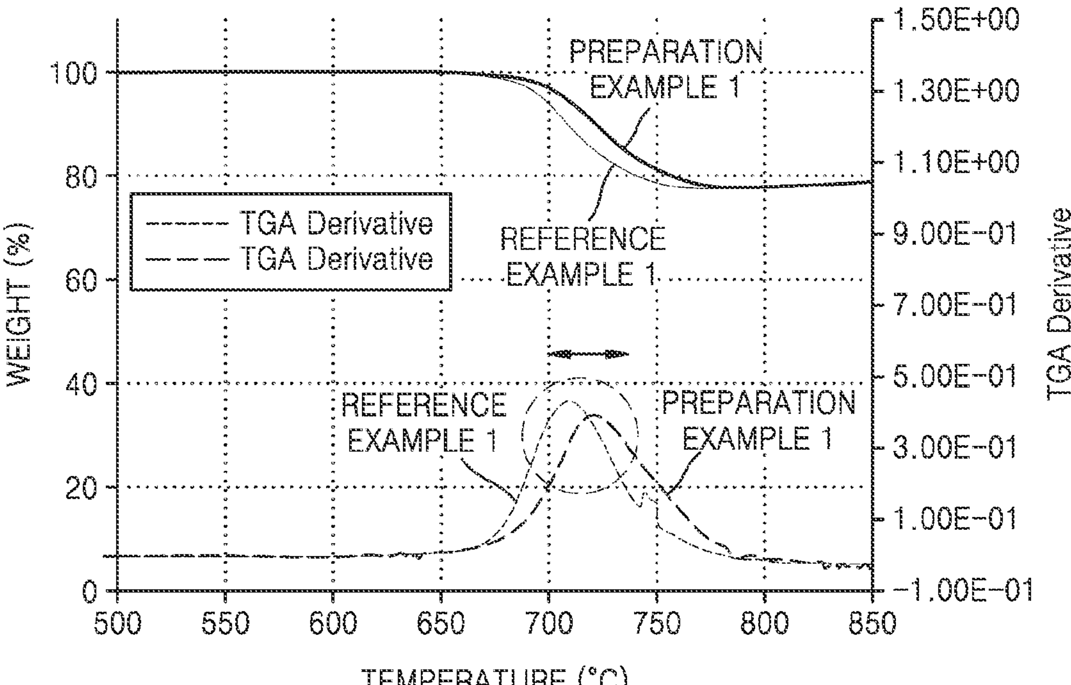
FIG. 5 is a graph of weight percent (%) versus temperature (° C.), which shows the results of thermogravimetric analysis for the porous silicon-containing composites prepared according to Preparation Example 1 and Reference Example 1.

The silicon-containing composite of Preparation Example 1 and Reference Preparation Example 1 were subjected to TGA, and the results are shown in FIG. 5.

Referring to FIG. 5, it was confirmed that the silicon-containing composite of Example 1 had a 20 weight % loss temperature of about 720° C., which was reduced in the silicon-containing composite of Reference Preparation Example 1 (20 weight % loss temperature of about 708° C.), resulting in improved thermal stability. In addition, it was observed that the TGA derivative peak position was shifted toward a higher temperature.

Evaluation Example 6: Direct-Current Internal Resistance (DCIR) Characteristics

1) Examples 1 to 8 and Comparative Example 1

The resistance characteristics of the coin full cells of Example 1 and Comparative Example 1 were measured after the $1^{st}$ and $100^{th}$ charging and discharging cycles according to the following method.

Each coin full cell was charged with a constant current of 0.1 C at a temperature of 25° C. until a voltage thereof reached 4.30 V (vs. Li), and maintained at a constant voltage mode until a current thereof reached a cut-off current of 0.05 C. Then, each coin full cell was discharged with a constant current of 0.1 C until a voltage thereof reached 2.8 V (vs. Li) (formation process, $1^{st}$ cycle). Such a charging and discharging cycle was performed two more times to complete the formation process.

Each coin full cell was charged with a constant current of 0.1 C (0.38 $mA/cm^2$) at a temperature of 25° C. until a voltage thereof reached 4.30 V (vs. Li), and maintained at a constant voltage mode until a current thereof reached a cut-off current of 0.05 C ($2^{nd}$ Cycle).

The full cell was charged with a constant current of 1.0 C at a temperature of 25° C. until a voltage thereof reached 4.30 V (vs. Li), and maintained at a constant voltage mode until a current thereof reached a cut-off current of 0.01 C. Then, each coin full cell was discharged with a constant current of 1.0 C until a voltage thereof reached 2.8 V (vs. Li) ($3^{rd}$ Cycle). Such a charging and discharging cycle was repeatedly performed ($100^{th}$ Cycle).

As such, following the charging and discharging cycle, the impedance of each coin full cell was evaluated by measuring resistance according to a 2-probe method using an impedance analyzer (Solartron 1260A Impedance/Gain-Phase Analyzer) at a temperature of 25° C. and in a frequency range of about $10^6$ megahertz (MHz) to about 0.1 MHz at a voltage bias of about 10 millivolts (mV). Accordingly, following the $1^{st}$ charging and discharging cycle, DCIR of each coin full cell was evaluated. The DCIR increase rate was calculated according to Equation 1, and the results of the evaluation are shown in Table 6:

DCIR increase rate (%)={(DCIR after $100^{th}$ cycle)/(DCIR after $1^{st}$ cycle)}×100% Equation 2

Accordingly, the coin full cell of Example 1 was found to have a reduced DCIR increase rate as compared with that of Comparative Example 1.

TABLE 6

| | DCIR increase rate (%) |
|---|---|
| Example 1 | 9.7 |
| Example 7 | 20.0 |
| Example 8 | 20.5 |
| Comparative Example 1 | 21.1 |

Referring to Table 6, it was confirmed that the coin full cells of Examples 1, 7, and 8 each had a reduced DCIR increase rate as compared with the coin full cell of Comparative Example 1.

2) Examples 7A, 7B, and 8A, and Comparative Example 1

The resistance characteristics of the coin full cells of Examples 7A, 7B, and 8A, and Comparative Example 1 were measured after the $1^{st}$ and $100^{th}$ charging and discharging cycles according to the following method.

Each coin full cell was charged with a constant current of 0.1 C at a temperature of 25° C. until a voltage thereof reached 4.30 V (vs. Li), and maintained at a constant voltage mode until a current thereof reached a cut-off current of 0.05 C. Then, each coin full cell was discharged with a constant current of 0.1 C until a voltage thereof reached 2.8 V (vs. Li) (formation process, $1^{st}$ cycle). Such a charging and discharging cycle was performed two more times to complete the formation process.

Each coin full cell was charged with a constant current of 0.1 C (0.38 mA/cm$^2$) at a temperature of 25° C. until a voltage thereof reached 4.30 V (vs. Li), and maintained at a constant voltage mode until a current thereof reached a cut-off current of 0.05 C ($2^{nd}$ Cycle).

The coin full cell was charged with a constant current of 1.0 C at a temperature of 25° C. until a voltage thereof reached 4.30 V (vs. Li), and maintained at a constant voltage mode until a current thereof reached a cut-off current of 0.01 C. Then, each coin full cell was discharged with a constant current of 1.0 C until a voltage thereof reached 2.8 V (vs. Li) ($3^{rd}$ Cycle). Such a charging and discharging cycle was repeatedly performed ($100^{th}$ Cycle).

As such, following the charging and discharging cycle, the impedance of each coin full cell was evaluated by measuring resistance according to a 2-probe method using an impedance analyzer (Solartron 1260A Impedance/Gain-Phase Analyzer) at a temperature of 25° C. and in a frequency range of about $10^6$ MHz to about 0.1 MHz at a voltage bias of about 10 millivolts (mV). Accordingly, following the $1^{st}$ charging and discharging cycle, DCIR of each coin full cell was evaluated. The DCIR increase rate was calculated according to Equation 2, and the results of the evaluation are shown in Table 7:

DCIR increase rate (%)={(DCIR after $100^{th}$ cycle)/(DCIR after $1^{st}$ cycle)}×100% Equation 2

Accordingly, the coin full cells of Examples 7A, 7B, and 8A were found to have a reduced DCIR increase rate as compared with that of Comparative Example 1.

TABLE 7

| | DCIR increase rate (%) |
|---|---|
| Example 7a | 10.5 |
| Example 7b | 1.5 |
| Example 8a | 5 |
| Comparative Example 1 | 21 |

Evaluation Example 7: Rate Capability

Each of the coin full cells of Example 1, 7, and 8 and Comparative Example 1 was charged with a constant current of 0.1 C at a temperature of 45° C. until a voltage thereof reached 4.30 V (vs. Li), and maintained at a constant voltage mode until a current thereof reached a cut-off current of 0.05 C. Then, each coin full cell was discharged with a constant current of 0.1 C until a voltage thereof reached 2.8 V (vs. Li) (formation process, $1^{st}$ cycle). Such a charging and discharging cycle was performed two more times to complete the formation process.

Each coin full cell was charged with a constant current of 0.1 C (0.38 mA/cm$^2$) at a temperature of 25° C. until a voltage thereof reached 4.40 V (vs. Li), and maintained at a constant voltage mode until a current thereof reached a cut-off current of 0.05 C ($2^{nd}$ Cycle).

The full cell was charged with a constant current of 0.5 C at a temperature of 25° C. until a voltage thereof reached 4.30 V (vs. Li), and maintained at a constant voltage mode until a current thereof reached a cut-off current of 0.01 C. Then, each coin full cell was discharged with a constant current of 0.5 C until a voltage thereof reached 2.8 V (vs. Li) ($3^{rd}$ Cycle).

The full cell was charged with a constant current of 1.0 C at a temperature of 25° C. until a voltage thereof reached 4.30 V (vs. Li), and maintained at a constant voltage mode until a current thereof reached a cut-off current of 0.01 C. Then, each coin full cell was discharged with a constant current of 1.0 C until a voltage thereof reached 2.8 V (vs. Li) ($4^{th}$ Cycle).

And a stopping time of 10 minutes after one charge/discharge cycle in all of the above charge/discharge cycles.

The rate capability of each coin full cell is defined by Equation 3:

Rate capability [%]=(Discharge capacity when a cell is discharged at a rate of 1 C in $3^{rd}$ cycle)/(discharge capacity when a cell is discharged at a rate of 0.2 C in $2^{nd}$ cycle)×100%    Equation 3

The results of the evaluation are shown in Table 8.

TABLE 8

| | Rate capability (1 C/0.2 C) |
|---|---|
| Example 1 | 95.3 |
| Example 7 | 98.9 |
| Example 8 | 96.3 |
| Comparative Example 1 | 93.9 |

Accordingly, it was confirmed that the coin full cells of Examples 1, 7, and 8 had improved rate capability characteristics as compared with the coin full cell of Comparative Example 1.

Evaluation Example 8: XPS Analysis (C/Si Amount)

The silicon-containing composites of Preparation Example 1 and Reference Preparation Example 1 were analyzed by XPS.

Quantitative analysis of amounts of carbon and silicon atoms in each sample was performed using XPS analysis. When a photon (X-ray) having a certain energy is irradiated on a sample, photoelectrons are emitted from the sample. When the kinetic energy of the photoelectrons is measured, a binding energy required for emitting the photoelectrons may be determined. Since such a binding energy is an intrinsic property of an atom, elemental analysis and measurement of the surface concentration of the element may be possibly performed. Based on the quantitatively analyzed amounts of carbon and silicon atoms, a C/Si amount may be calculated.

The XPS analysis was performed using a Quantum 2000 (Physical Electronics. Inc.) (acceleration voltage: 0.5 keV-15 keV, 300 W, energy resolution: about 1.0 eV, minimal analysis area: 10 micro, and sputter rate: 0.1 nm/min).

After each sample was vacuum dried at a temperature of 110° C. for 12 hours, each sample was transferred to a preliminary chamber of the XPS spectrometer. The chamber was then subjected to degasification at a temperature of 25° C. in a vacuum of about $10^{-4}$ torr to about $10^{-5}$ torr. Then, each sample was transferred into the analysis chamber and measured when the background vacuum was on the order of 10-1% torr.

Figure 6:
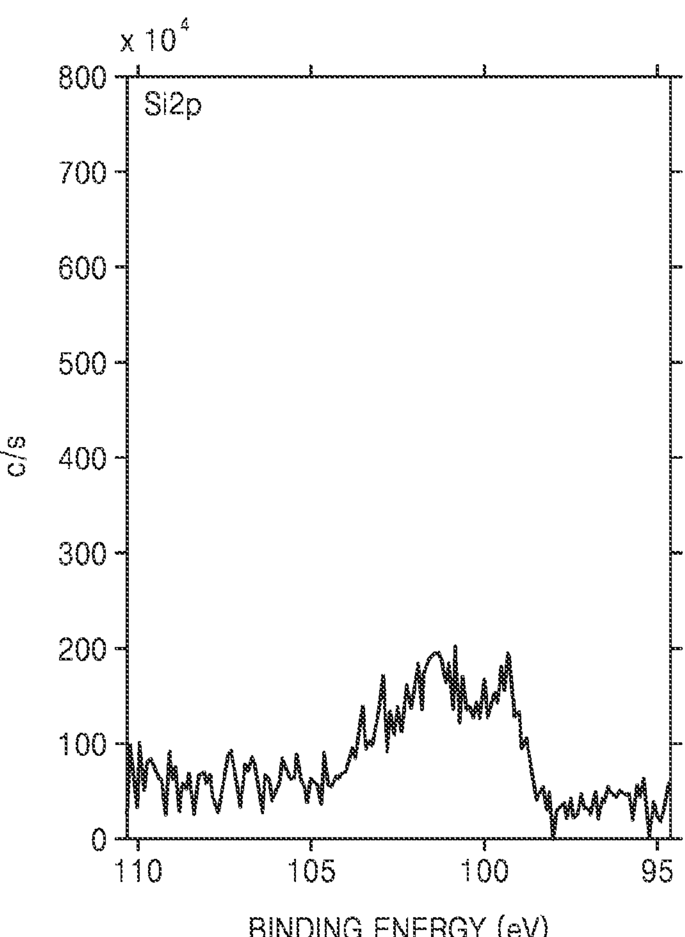
FIGS. 6 to 8 are graphs of intensity versus binding energy (electron volts, eV), which show the results of X-ray photoelectron spectroscopic analysis for the porous silicon composite prepared according to Preparation Example 1.
Figure 7:
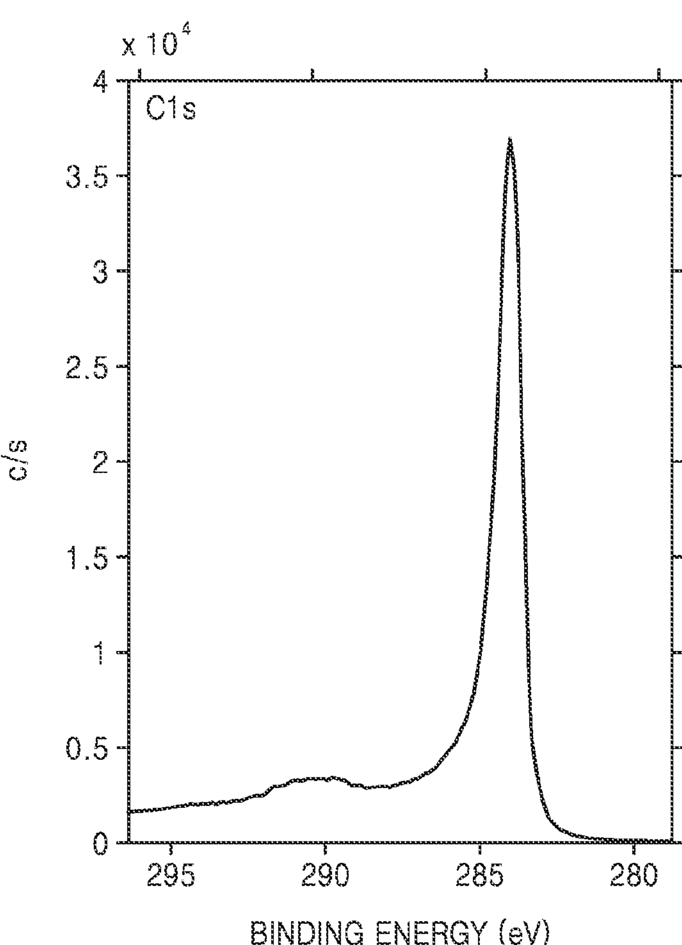
Figure 8:
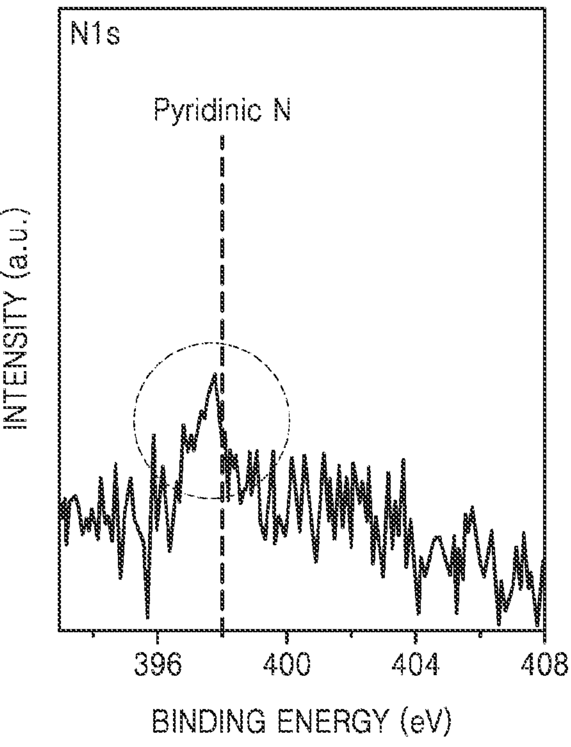

Here, peaks with a binding energy of about 98 eV to about 105 eV belong to Si2p, and peaks with a binding energy of about 282 eV to about 297 eV belong to c1s. As a ratio of the integral value of these peaks, the C/Si amount was calculated. Among the results of the XPS analysis, peaks belonging to C1s, Si2p, and N1s are each shown in FIGS. 6 to 8, and the C/Si amount and each element amount are shown in Table 9.

TABLE 9

| | C/Si | Atomic % | | | |
|---|---|---|---|---|---|
| | (atomic ratio) | C1s | Si2p | N1s | O1s |
| Preparation Example 1 | 161.34 | 98.42 | 0.61 | 0.15 | 0.82 |
| Reference Preparation Example 1 | 29.9 | 94.48 | 3.15 | 0 | 2.37 |

Referring to Table 9, the silicon-containing composite of Preparation Example 1 was found to have a significantly increased C/Si amount, as compared with that of Reference Preparation Example 1. Accordingly, it was confirmed that the silicon-containing composite of Preparation Example 1 had better adhesion between silicon/silicon suboxide and graphene and better coating uniformity of graphene, as compared with that of Reference Preparation Example 1.

Evaluation Example 9: Transmission Electron Microscopy (TEM)

The silicon-containing composite of Preparation Example 1 was analyzed by TEM using a Titan cubed G2 60-300 (FEI).

Figure 11A:
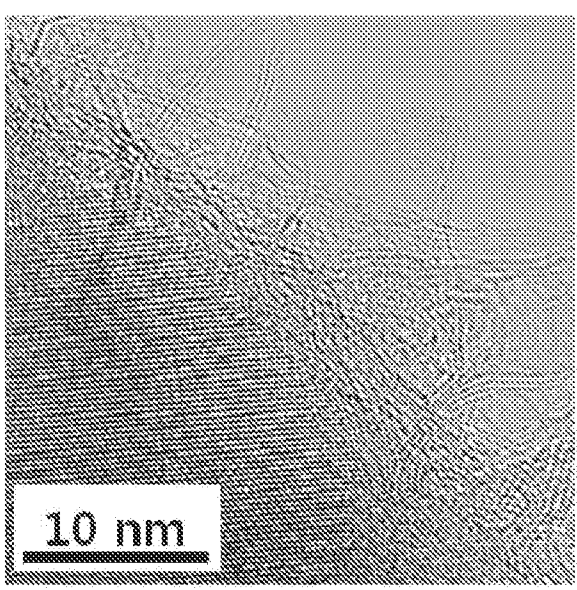
FIGS. 11A and 11B are transmission electron microscope (TEM) images of the silicon-containing composite prepared according to Preparation Example 1.
Figure 11B:
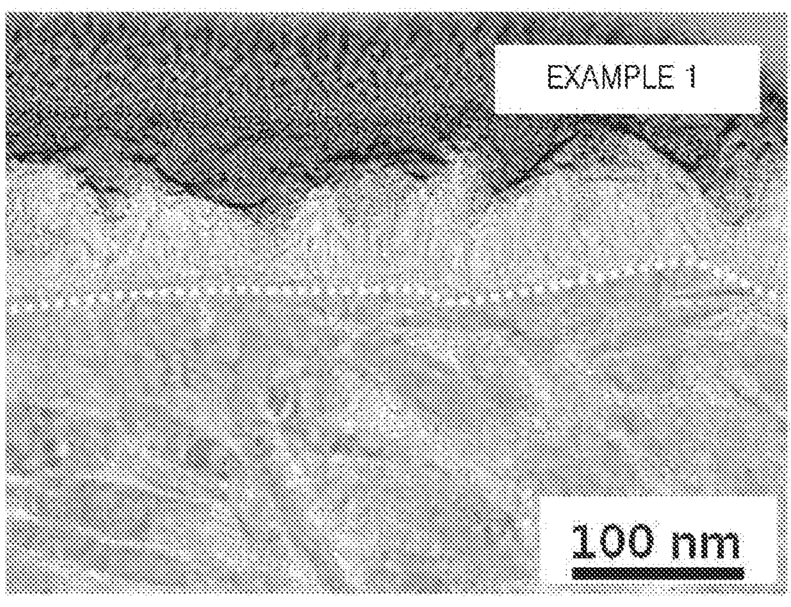

The resulting TEM images of the silicon-containing composite of Preparation Example 1 are shown in FIGS. 11A and 11B.

Referring to FIGS. 11A and 11B, it was confirmed that the silicon-containing composite of Preparation Example 1 had good adhesion between silicon/silicon oxide and graphene and good coating uniformity of graphene over the silicon/silicon oxide.

As shown in FIG. 11A, the first graphene and the second graphene were found to be oriented at an angle of about 90% with respect to a major axis (Y-axis) of the silicon suboxide film ($SiO_x$, wherein $0<x<2$) formed on the surface of the plate- and needle-like silicon particles.

As described above, according to an embodiment, when used as an electrode active material, a silicon-containing composite may form a network between silicon particles to thus suppress expansion of an electrode plate during charging and discharging, and may improve the initial efficiency and volume energy density of a lithium battery. The silicon-containing composite may also form a conductive and durable protective layer for silicon, and thus may improve durability of the lithium battery against charging and discharging.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A silicon-containing composite comprising:

a porous core comprising a porous silicon composite secondary particle; and a shell on a surface of the porous core and surrounding the porous core, wherein the porous silicon composite secondary particle comprises an aggregate of silicon composite primary particles, the silicon composite primary particles comprising silicon, a silicon suboxide on a surface of the silicon, and a first graphene on a surface of the silicon suboxide, wherein the shell comprises a second graphene, and wherein the first graphene and the second graphene comprise at least one element of nitrogen, phosphorus, and sulfur, in and throughout the first and second graphene, wherein the silicon-containing composite comprises a first core/shell structure and a second core/shell structure, the first core/shell structure comprises the porous core comprising the porous silicon composite secondary particle and the shell comprising the second graphene on the surface of the porous core, and the second core/shell structure comprises a core comprising the silicon and the silicon suboxide on a surface of the silicon, and the shell of the second core/shell structure comprises the first graphene on a surface of the silicon suboxide, and wherein the second graphene of the shell has a density which is greater than a density of the first graphene of the porous core.

2. The silicon-containing composite of claim 1, wherein the first graphene and the second graphene are each independently in a form of a film, a particle, a matrix, or a combination thereof.

3. The silicon-containing composite of claim 1, wherein the first graphene is disposed primarily within the porous core of the silicon-containing composite, and the second graphene is disposed directly on the surface of the silicon composite secondary particle to provide the shell of the silicon-containing composite.

4. The silicon-containing composite of claim 1, wherein an amount of the at least one of nitrogen, phosphorus, and sulfur in the silicon-containing composite is about 0.05 atomic percent to about 0.2 atomic percent at a distance of 10 nanometers or less from an outer surface of the second graphene shell, as analyzed by X-ray photoelectron spectroscopy.

5. The silicon-containing composite of claim 1, wherein a carbon to silicon atomic ratio in the silicon-containing composite is from about 100:1 to about 200:1, when analyzed by X-ray photoelectron spectroscopy, and wherein the carbon to silicon atomic ratio is greater than a carbon to silicon atomic ratio in a comparable silicon-containing composite that does not include the at least one element of nitrogen, phosphorous, and sulfur.

6. The silicon-containing composite of claim 1, wherein an intensity ratio of peak D to peak G in the silicon-containing composite is 1.0 to 1.4, when analyzed by Raman spectroscopy.

7. The silicon-containing composite of claim 1, wherein as measured by thermogravimetric analysis, a 20% weight loss temperature of the silicon-containing composite is about 7° C. to about 15° C. greater than a 20% weight loss temperature of a comparable silicon-containing composite that does not include the at least one element of nitrogen, phosphorous, and sulfur.

8. The silicon-containing composite of claim 1, wherein the first graphene positioned in the porous core comprises a plurality of layers and the second graphene of the shell comprises a plurality of layers.

9. The silicon-containing composite of claim 1, wherein the first graphene is formed from a carbon source gas to provide the shell of the second core/shell structure, and the second graphene is formed from the carbon source gas to provide the shell of the first core/shell structure.

10. The silicon-containing composite of claim 1, wherein the total amount of the first graphene and the second graphene is from about 0.1 parts by weight to about 2,000 parts by weight based on 100 parts by weight of silicon.

11. The silicon-containing composite of claim 1, wherein the first graphene is oriented at an angle of about 0° to about 900 with respect to a major axis of the silicon, and the silicon-containing composite has a specific surface area of about 0.1 square meter per gram to about 30 square meters per gram.

12. The silicon-containing composite of claim 1, wherein the first graphene comprises about 5 to about 20 graphene layers, and has a total thickness of about 0.3 nanometers to about 1,000 nanometers.

13. The silicon-containing composite of claim 1, wherein the second graphene is oriented at an angle of about 0° to about 90° with respect to a major axis of the silicon, and the silicon-containing composite has a specific surface area of about 0.1 square meter per gram to about 30 square meters per gram.

14. The silicon-containing composite of claim 1, wherein the second graphene comprises about 10 to about 40 graphene layers, and has a total thickness of about 0.6 nanometers to about 50 nanometers.

15. The silicon-containing composite of claim 1, wherein the silicon suboxide has a thickness of about 0.1 nm to 10 nm.

16. The silicon-containing composite of claim 1, wherein the silicon has a form comprising a nanowire, a needle, a rod, a particle, a nanotube, a nanorod, a wafer, a nanoribbon, or a combination thereof.

17. The silicon-containing composite of claim 16, wherein the porous silicon composite secondary particle has an average particle size (D50) of about 1 micrometer to about 30 micrometers, a particle size (D90) of about 10 micrometer to about 30 micrometers, and a density of about 0.1 gram per cubic centimeter to about 2.0 grams per cubic centimeter.

18. The silicon-containing composite of claim 1, wherein the silicon is in the form of a wafer with a thickness of 1 μm to 500 μm.

19. The silicon-containing composite of claim 1, further comprising a carbonaceous coating layer on a surface of the silicon-containing composite, the carbonaceous coating layer comprising amorphous carbon.

20. The silicon-containing composite of claim 19, wherein the carbonaceous coating layer further comprises the at least one element of nitrogen, phosphorous, and sulfur.

21. The silicon-containing composite of claim 19, wherein the carbonaceous coating layer further comprises crystalline carbon.

22. The silicon-containing composite of claim 19, wherein the carbonaceous coating layer is a non-porous continuous coating layer, and has a thickness of about 1 nanometer to about 5,000 nanometers.

23. A method of preparing the silicon-containing composite of claim 1, the method comprising:

providing a parous silicon composite secondary particle;

supplying at least one of a nitrogen precursor, a phosphorus precursor, or a sulfur precursor, and a gas comprising a carbon source, to the porous silicon composite secondary particle; to form a supplied porous silicon composite secondary particle; and thermally treating the supplied porous silicon composite secondary particle to form the shell on the porous silicon composite secondary particle and prepare the silicon-containing composite.

24. The method of claim 23, wherein the thermally treating comprises reacting the porous silicon composite secondary particle with the carbon source and the at least one of the nitrogen precursor, the phosphorous precursor, or the sulfur precursor.

25. The method of claim 23, wherein the providing the porous silicon composite secondary particle comprises preparing a composition comprising a dispersing agent, a first solvent, and particles comprising silicon and silicon suboxide on a surface of the particles comprising silicon.

26. The method of claim 25, wherein the first solvent comprises an alcohol, and wherein the providing the porous silicon composite secondary particle comprises spray-drying the composition.

27. The method of claim 25, wherein the dispersing agent comprises stearic acid, resorcinol, polyvinyl alcohol, carbon pitch, or a combination thereof.

28. The method of claim 23, wherein the nitrogen precursor is ammonia.

29. The method of claim 23, wherein the carbon source comprises a compound represented by Formula 1, a compound represented by Formula 2, an oxygen-containing compound represented by Formula 3, or a combination thereof:

$$C_nH_{2n+2-a)}[OH]_a \quad \text{[Formula 1]}$$

wherein, in Formula 1, n is an integer of 1 to 20, and a is 0 or 1, $$C_nH_{(2n)} \quad \text{[Formula 2]}$$

wherein, in Formula 2, n is an integer of 2 to 6, or $$C_xH_yO_z \quad \text{[Formula 3]}$$

wherein, in Formula 3, x is an integer of 1 to 20, y is or an integer of 1 to 20, and z is 1 or 2.

30. The method of claim 29, wherein the gas compromising a carbon source further comprises a first oxygen-containing compound represented by Formula 3a, which is different from the oxygen-containing compound of Formula 3:

$$C_xH_yO_z \quad \text{[Formula 3a]}$$

wherein, in Formula 3a, x is 0 or an integer of 1 to 20, y is 0 or an integer of 1 to 20, and z is 1 or 2.

31. The method of claim 23, wherein the gas comprising a carbon source comprises methane, ethylene, propylene, acetylene, methanol, ethanol, propanol, or a combination thereof.

32. The method of claim 23, wherein a amount of the at least one of the nitrogen precursor, the sulfur precursor, or the phosphorus precursor is about 20 volume percent or less, based on the total volume of the gas comprising a carbon source and the at least one of the nitrogen precursor, the sulfur precursor, or the phosphorus precursor.

33. The method of claim 23, wherein the thermally treating is performed at a temperature of about 750° C. to about 1,100° C.

34. The method of claim 23, further comprising dry-blending a mixture comprising the porous silicon composite secondary particle, a carbonaceous material, and a solvent to obtain a coated porous silicon-composite secondary particle comprising a carbonaceous coating layer formed thereon.

35. The method of claim 34, wherein the mixture further comprises at least one of the nitrogen precursor, the sulfur precursor, or the phosphorus precursor.

36. The method of claim 34, further comprising reacting the coated porous silicon composite secondary particle comprising the carbonaceous coating layer with at least one of the nitrogen precursor, the sulfur precursor, and the phosphorus precursor.

37. A carbon composite comprising the silicon-containing composite of claim 1 and a carbonaceous material.

38. The carbon composite of claim 37, wherein an amount of the carbonaceous material is about 0.001 part by weight to about 99 parts by weight based on 100 parts by weight of the carbon composite.

39. An electrode comprising the silicon-containing composite of claim 1, a carbon composite comprising the silicon-containing composite of claim 1 and a carbonaceous material, or a combination thereof.

40. The electrode of claim 39, wherein the carbonaceous material comprises graphene, graphite, fullerene, graphitic carbon, carbon fiber, carbon nanotube, or a combination thereof, and an amount of the carbonaceous material is about 0.001 part by weight to about 99.999 parts by weight based on 100 parts by weight of the carbon composite.

41. A lithium battery comprising the electrode of claim 39.

42. A device comprising the silicon-containing composite of claim 1, a carbon composite comprising the silicon-containing composite and a carbonaceous material, or a combination thereof.

43. The device of claim 42, wherein the device is a field emission device, a biosensor, a semiconductor device, or a thermoelectric device.

44. A silicon-containing composite comprising:

a core comprising a porous silicon composite secondary particle; and a shell on and surrounding the core, wherein the porous silicon composite secondary particle comprises an aggregate of silicon composite primary particles, the primary particles comprising a silicon suboxide, a thermal treatment product of the silicon suboxide, or a combination thereof; and a first graphene on a surface of the silicon suboxide or the thermal treatment product of the silicon suboxide, wherein the shell comprises a second graphene, and the first graphene and the second graphene comprise at least one element of nitrogen, phosphorus, and sulfur, wherein the thermal treatment product of the silicon suboxide is obtained by thermally treating the silicon suboxide in an atmosphere comprising a carbon source gas or a combination of a carbon source gas and a reducing gas at a temperature of 600° C. to 1100° C., and the second graphene of the shell has a density which is greater than a density of the first graphene of the core.

45. The silicon-containing composite of claim 44, wherein the thermal treatment product of the silicon suboxide has a structure comprising silicon arranged in a matrix of $SiO_y$, wherein $0<y<2$.

46. The silicon-containing composite of claim 44, wherein the thermal treatment product of the silicon suboxide comprises:

a structure comprising silicon in a matrix of $SiO_2$, a structure comprising silicon in a matrix comprising $SiO_2$ and $SiO_y$, wherein $0<y<2$, or a structure comprising silicon in a matrix of $SiO_y$, wherein $0<y<2$.

* * * * *